| X INPUT | Y INPUT | INITIAL CARRY | CHANGE SIGNAL | SUM OUTPUT | CARRY OUTPUT |
|---|---|---|---|---|---|
| 0 | 0 | 0 | | 0 | 0 |
| 0 | 1 | 0 | ✓ | 1 | 0 |
| 1 | 0 | 0 | | 1 | 0 |
| 0 | 0 | 1 | ✓ | 1 | 0 |
| 1 | 1 | 0 | ✓ | 0 | 1 |
| 0 | 1 | 1 | | 0 | 1 |
| 1 | 0 | 1 | ✓ | 0 | 1 |
| 1 | 1 | 1 | | 1 | 1 |

| | | | | |
|---|---|---|---|---|
| FIG 2a | FIG 2b | FIG 2c | FIG 2d | FIG 2e |
| FIG 2f | FIG 2g | FIG 2h | FIG 2i | FIG 2j |

*INVENTOR.*
LEONARD ROY HARPER
*BY* Carl W. Laumann Jr.
ATTORNEY

Sept. 28, 1965 L. R. HARPER 3,209,131

COMPUTER CIRCUIT FOR PERFORMING SERIAL ADDITION AND SUBTRACTION

Filed July 11, 1960 13 Sheets-Sheet 2

Sept. 28, 1965 L. R. HARPER 3,209,131

COMPUTER CIRCUIT FOR PERFORMING SERIAL ADDITION AND SUBTRACTION

Filed July 11, 1960 13 Sheets-Sheet 7

Sept. 28, 1965 L. R. HARPER 3,209,131

COMPUTER CIRCUIT FOR PERFORMING SERIAL ADDITION AND SUBTRACTION

Filed July 11, 1960 13 Sheets-Sheet 8

3,209,131
Patented Sept. 28, 1965

3,209,131
COMPUTER CIRCUIT FOR PERFORMING SERIAL ADDITION AND SUBTRACTION

Leonard R. Harper, San Jose, Calif., assignor to International Business Machines Corporation, New York, N.Y., a corporation of New York Filed July 11, 1960, Ser. No. 42,114
8 Claims. (Cl. 235—164)

This is a continuation-in-part of application Serial No. 738,199, filed May 27, 1958, now Patent No. 3,132,245.

This invention relates to the electronic circuits of a binary computer. It more particularly concerns circuits for performing addition, subtraction, multiplication and division, with two numbers recorded in a binary storage device.

An object of the invention is to provide an improved arithmetic circuit for receiving alternately and serially at one single input, the binary information concerning two numbers and serially delivering to an output terminal the binary information relating to the result of the operation effected on the two numbers.

Another object of the invention is to provide an improved circuit for serial addition of two binary numbers X and Y, received alternately by one input terminal, with a combination of logical circuits controlling a storage trigger, which may store the number X bit with logical circuits adding, if needed, the number Y bit to the possible carry resulting from a previous operation, such sum being then recorded into the accumulator so that the result of the elementary operation may be collected at the trigger output.

A further object of the invention is to provide an improved combination of logical circuits for controlling an accumulator also capable of subtracting a number X from the number Y by adding to bit X recorded in the accumulator the complement of the corresponding bit of Y and, if needed, the above mentioned carry, so that the complement of the elementary operation result will be available at the terminals of the accumulator.

Another object of the invention is to provide an improved circuit for performing addition or subtraction according to given instructions and the sign for the numbers by means of a trigger circuit, the alternate conditions of which cause logical circuits to perform an addition or a subtraction.

A further object of the invention is to provide an improved computing machine wherein the result of a multiplication may be a number higher than the maximum number that may be recorded in a given region of the memory, by the provision of a control device permitting modification of the values normally assigned to the various locations of a buffer region of the memory, so that the order of a location $2^p$ should give out in said buffer region the value $2^{n+p}$, $n$ being the number of binary positions of a normal region (the sign location being excluded).

Another object of the invention is to provide an improved computing machine wherein the dividend of a division may be a number higher than the maximum number that may be stored in a memory region, due to the combination of the buffer region described above and storing the information of the highest orders with the memory region normally assigned to this number.

A further object of the invention is to provide an improved computing machine, wherein the variable program is determined by a wiring and by a combination of logical circuits permitting selection of the instruction controlling the arithmetical unit, the address of the two operating numbers and the following program step.

Another object of the invention is to provide an improved computing machine wherein the program sequence may be modified during the program by electronic circuits for sensing whether the result of an operation is positive, negative, or zero.

A further object of the invention relates to an improved means for effecting a decimal half adjustment or rounding operation, or an adjustment according to another system, or numbers recorded under the binary form into a storage device by combining with said memory a table indicating the binary equivalent of the order divided by two, so that by addng a suitable number from the table to the number to be adjusted and then dropping the lowest order digits, the half adjustment is obtained.

Another object of the invention is to provide an improved means for performing a decimal shifting (or a shifting according to another system) in a number recorded under the binary form in a storage device, by multiplying or dividing it by two times the appropriate number of the above defined table.

Briefly stated, the invention accomplishes these objects through logic circuits controlling an accumulator, into which a first number may be placed from a storage device. The number in the accumulator is then modified according to the sign and the value of another number and the arithmetic operation to be performed.

The foregoing and other objects, features and advantages of the invention will be apparent from the following more particular description of a preferred embodiment of the invention, as illustrated in the accompanying drawings.

In the drawings:

FIG. 1*a* is a simplified circuit diagram of the change adder used in this invention;

FIG. 1*b* is a truth table illustrating the method of addition used by the circuit of FIG. 1*a*;

Figures 1A, 1B, 2:
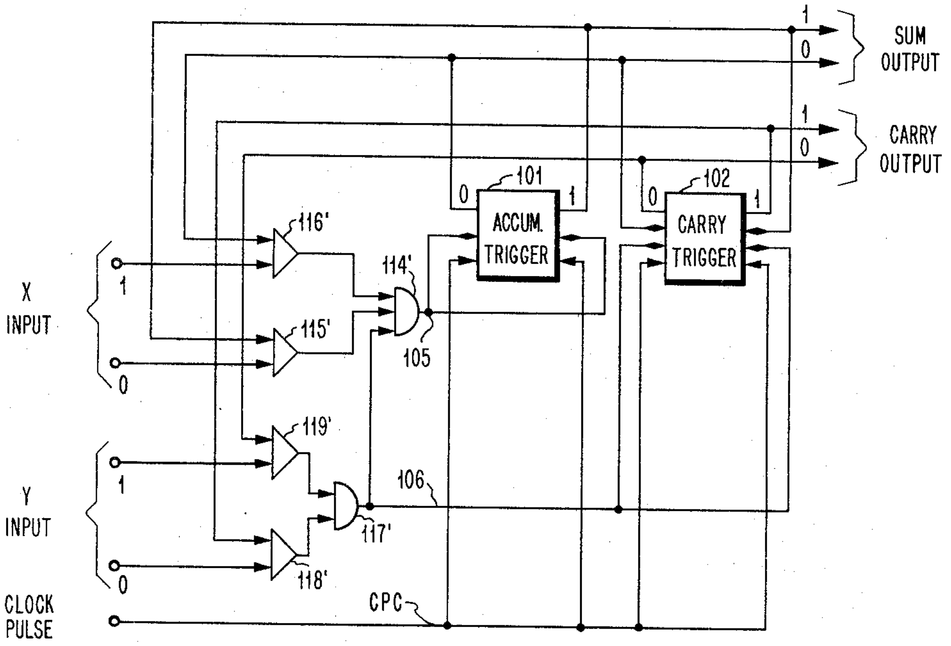
FIG. 2 shows the manner in which FIGS. 2*a* through 2*h* may be assembled to obtain the full circuit diagram.

FIG. 1*a* shows a simplified circuit diagram from which an understanding may be gained of the operation of the adding device of this invention, and FIG. 1*b* is a truth table from which the logic of the binary addition is apparent. The reference numerals appearing in FIG. 1*a* designate components corresponding to those also designated in the complete circuit diagram, FIGS. 2*a* through 2*j*, and certain of the components are designated with prime marks to indicate components having a similar, but not identical, function to the corresponding components for the larger circuit diagram.

Addition of the two numbers, X and Y, is accomplished by first storing a digit of X in accumulator trigger 101 and then changing the state of this trigger in accordance with a comparison between a digit of Y and any carry derived from addition of the next lower order of digits, the carry indication being stored in a carry trrigger 102. The X input includes an exclusive OR circuit comprising two AND circuits 115' and 116' and an OR circuit 114'. Thus, for example, if the *x* input is 1 and accumulator trigger 101 was off indicative of a 0, then both inputs of the AND circuit 116' are conditioned and a signal passes to trirgger 101 via the OR circuit 114' and lead 105. This signal conditions trigger 101 so that the next CPC clock pulse causes the trigger 101 to reverse its condition state and turn ON to indicate a 1. A signal applied to the diamond shaped trigger inputs conditions the trigger to respond to a signal applied to the arrow shaped inputs beneath. Thus when both diamond shaped inputs are energized, a signal applied to both arrow shaped inputs operates to change the state of the trigger. This will be discussed in greater detail at another point. It may also be seen that if the X input digit is 0 and the trigger 101 is turned ON indicative of a 1 then both inputs of AND circuit 115' are conditioned and a signal is passed through the OR circuit 114' and the lead 105 to condition trigger 101 for reversal upon receiving a CPC clock pulse. AND circuits 115 and 116 together with OR circuit 114' function to store the X digit in trigger 101 at the time of a CPC clock pulse.

Having stored the X input digit in trigger 101, the circuit of FIG. 1*a* may selectively change both accumulator trigger 101 and the carry trigger 102 to derive appropriate sum and carry outputs in response to a Y digit. This is accomplished by an exclusive OR circuit comprising AND circuits 118' and 119' and OR circuit 117'. This exclusive OR circuit compares the Y input digit with a digit stored in the carry trigger 102, and functions to deliver a change signal to accumulator trigger 101 when the Y and carry digits are unequal. Thus, if the Y input digit is a 1 and the carry trigger 102 is OFF, indicative of 0 both of the inputs of the AND circuit 119' are conditioned to pass a signal to OR circuit 117', which results in a change signal on the lead 106. Similarly, if the Y input digit were 0 and the carry trigger 102 were ON, indicative of a 1, then a change signal would be developed by the AND circuit 118' and passed by the OR circuit 117' to the lead 106. On the other hand, if the Y input digit is equal to the carry digit, as stored by the carry trigger 102, then no change signal is developed, since neither AND circuit is conditioned to pass a signal.

FIG. 1*b* tabulates the X, Y and carry digit combinations shown in the first three columns. As stated above, with reference to the exclusive OR circuit 117', 118', 119', a change signal will be developed whenever the Y digit is not equal to the carry, and the check marks in the fourth column of FIG. 1*b* indicate those instances when the Y input is not equal to the initial carry thus producing a change signal on the lead 106.

Whenever a change signal appears on the lead 106, it is passed by the OR circuit 114' to the lead 105 to condition accumulator trirgger 101 such that the next CPC clock pulse will reverse the state of that trigger. Conversely, if no change signal is developed, then the accumulator trigger 101 will remain in the state corresponding to the X input digit, and the sum output will equal the X input. On the other hand, when a change signal is developed then the state of the accumulator trigger is changed and the sum output is opposite to the X input. This is shown in FIG. 1*b* which shows the sum output to be equal to the X input at all times when no change signal is developed, and shows the sum output to be different from the X input at all times when a change signal is developed.

A change signal on line 106 partially conditions carry trigger 102. The carry trigger is further conditioned by input leads coupled to the corresponding 1 and 0 output leads of accumulator trigger 101. When the carry trigger 102 is conditioned by a change signal on the lead 106, then the next CPC clock pulse will cause the carry trigger 102 to be set in agreement with the accumulator trigger 101. This logic is clarified by FIG. 1*b*, which shows that the carry output is always equal to the initial carry in the absence of a change signal. On the other hand, when a change signal is produced the carry output is made to agree with the X input.

In the operation of the trigger 101, conditioning voltages may be applied to the appropriate diamond shaped inputs which will then permit the next CPC clock pulse to reverse the state of the trigger. Trigger 102 requires that both diamond shaped inputs on one side be conditioned to permit a CPC clock pulse to turn that side ON. The CPC clock pulses are applied simultaneously to both triggers and will reverse either or both triggers depending upon the prior voltage conditioning of the diamond shaped gates. Therefore, the carry trigger may be set in accordance with the initial state of the accumulator trigger even though the accumulator trigger may be reversed by the same clock pulse. This method of reversing or resetting triggers permits the simultaneous generation of both the sum and the carry output signals and eliminates any necessity for critical timing of the input conditioning signals.

The electronic assembly to be described operates on two numbers, both of which are represented by signals stored in a core matrix having a line for each number. A complete description of the core matrix storage device, together with input and output decimal to binary and binary to decimal code converting circuits, is made in a copending application for a United States Patent, Serial No. 738,199, filed May 27, 1958 by this inventor. As indicated in this copending patent application, all operations are performed serially and the two numbers which are to be combined in an arithmetic operation ordinarily includes a series of digits in ascending numerical orders and are referred to as "words."

If the two words are designated by X and Y, the sequence of the elementary binary opertaions is the reading of X from the core matrix, regeneration of X into the core matrix at the same address as the one from which it was read, reading of word Y, recording into the core matrix at the address from which Y was read the result of the elementary operation performed on X and Y, and so on, from one digit to the next one in increasing order. This will appear more clearly by referring to the timing diagram represented in FIG. 3.

The first graph, MV, represents the output voltage of the basic multivibrator (not shown) which is of the alternate double periods type. This multivibrator operates at two frequencies, each frequency of operation occurring during alternate cycles of the multivibrator. The short periods correspond to recording or write times, and the longer periods correspond to reproducing or read times. At the beginning of each read time, a core is selected, and at the end of the read time, the arithmetic unit elements are conditioned to determine the digit to be recorded in the core during the next recording time.

Figure 3:
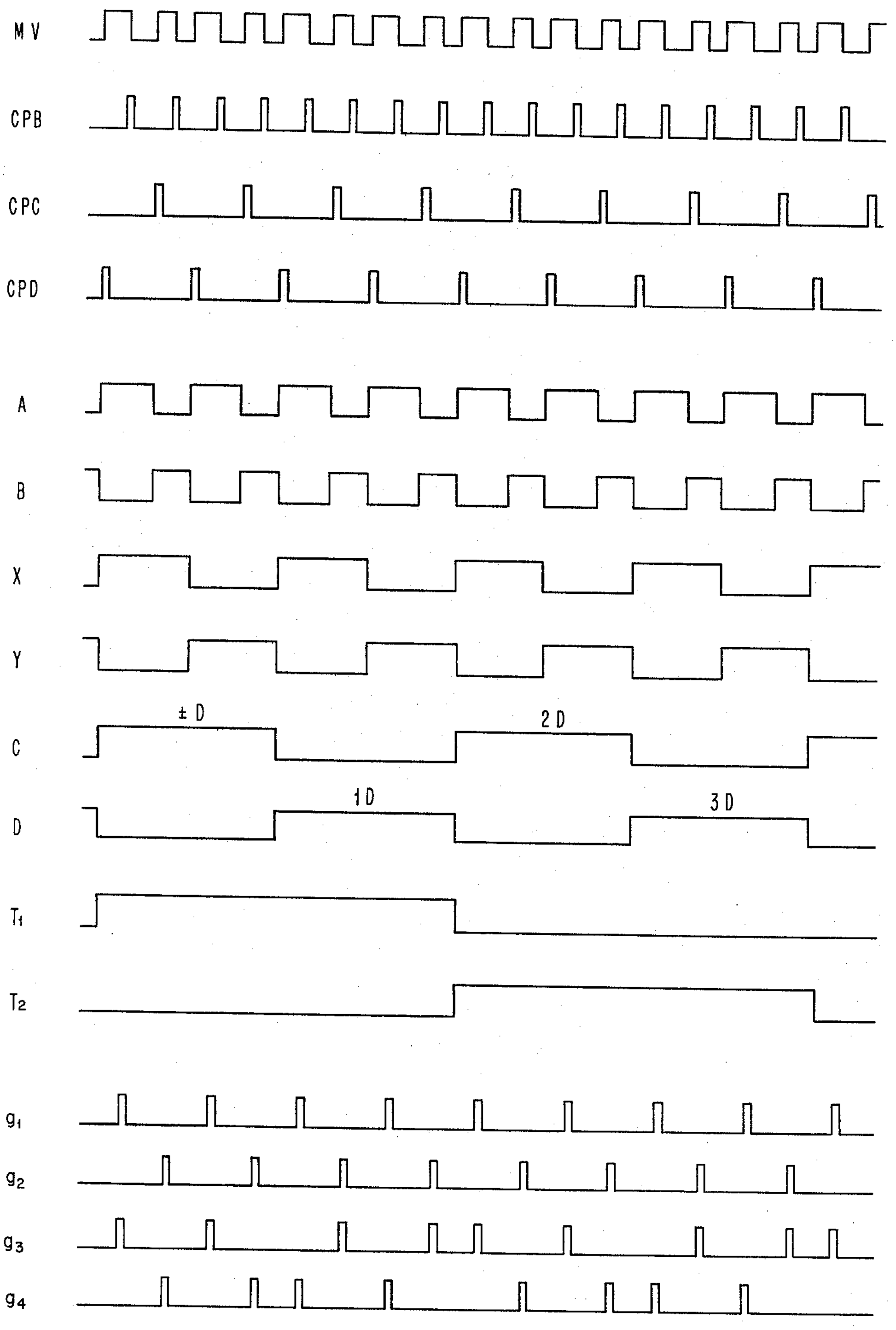
FIG. 3 is a timing chart for the principal clock pulses.

Timing pulses are represented in CPB, CPC, CPD, FIG. 3. CPB pulses occur at midtime of the recording and reading period; they are used to start the core read and record current pulse generators. CPC pulses occur at the end of the read times and are used to actuate the triggers of the arithmetical unit. CPD pulses appear at the end of the recording periods, and are primarily used to advance the triggers of the primary chain to allow the selection of the next digit.

In FIG. 3, the graphs A, B, X, Y, C and D, represent the principal timing signals. The times during which such signals are high are respectively identified as A time, or read time; B time or recording time; X time and Y time, the time spent for processing a digit of the number X and number Y, respectively; C time and D time, the time corresponding to processing a digit of even and odd orders, respectively. Successive times C and D are called ±D, 1D, 2D, 3D, etc., because the first elementary information of the word concerns the sign, the second concerns the first binary order, the third concerns the second order, etc. A primary chain which has been included in the timing system further delivers 16 pulses T1, T2 . . . T16, which appear serially on 16 different outputs.

The arthimetic apparatus of this invention makes use of certain basic circuits, which are described in the copending patent application Serial No. 738,199, supra, and therefore will not be fully described in this specification. These basic circuits include diode AND circuits having two or more input connections for receiving signals and a single output connection which will pass an appropriate output signal only when corresponding input signals are received at all of the input connections. The AND gate is further characterized by the feature where a low input to the gate clamps the output of the gate to a low level. Another basic circuit is an OR circuit having two or more input connections and a single output connection at which will pass an appropriate output signal when a corresponding input signal appears on any one or more input connections. In the circuit diagram, FIGS. 2*a* through 2*j*, AND circuits are represented by triangles while OR circuits are shown as semicircles.

Another basic circuit is a gate which will deliver an output pulse when a potential is applied to a resistance input immediately prior to the occurrence of a positive pulse from a conductor input which must approximate the average output potential. If any one of the potentials is lower, the diode is blocked, and no output pulse will be delivered.

A further basic circuit is an inhibiting circuit, which operates as follows: An output signal is high if either or both of two inputs is high, provided that the level of a third input is likewise high. If the level of the third input is low, a diode inhibits the signal from the first two inputs. A connected diode can therefore cancel the signal from an OR circuit, or may cancel the action of the logical circuits preceding this circuit.

Another basic circuit is an inverter using a transistor. The output signal of an inverter circuit is high when the input signal is low and vice versa; and therefore, a binary 1 is converted to a binary 0 and a 0 is converted to a 1.

A further basic circuit is a current driver or current amplifier using a transistor mounted as an emitter-follower.

Another basic circuit described in the copending application is a trigger comprising four transistors. The trigger entries are made as positive pulses applied to input terminals which are operative only if certain further input terminals are high. The outputs are collected on a pair of output terminals. Conventionally, the trigger is said to be OFF when the left output is high and the right output is low, and the trigger is ON in the reverse condition.

Another circuit described in the aforesaid copending application is a pulse generator with two complementary transistors. The generator is started by a pulse which operates one of the transistors only if another input is high, whereupon an output pulse is generated.

Another previously described pulse generator provides reading and recording currents to the memory cores. The pulses appear in response to smaller pulses applied at an input terminal.

STORAGE AND SCANNING SYSTEM

As described in the copending patent application Serial No. 738,199, supra, a two-dimension magnetic core matrix having rows and columns is provided for storage. The numbers are recorded therein one per row. A magnetic core decoder permits conversion from the decimal system to the binary system and vice versa, each row corersponding to a decimal order, and each column to a binary order. The decoder which inserts and extracts data from the memory, is used for arithmetic purposes only for secondary operations, such as decimal half-adjustment or decimal word shifting to the right or to the left. The decoder may contain the binary equivalent of the orders of numeration systems other than the decimal system.

In each row of cores in the matrix a first core is provided to store the information concerning the sign, the next succeeding cores store numerical information data in the increasing binary order. Each decoder now stores the binary equivalent of a power of 10, but it is to be remarked that the decoder binary information data is shifted one column, that is one order, to the right with respect to those of the memory. This feature will be used in rounding operations.

Figure 5:
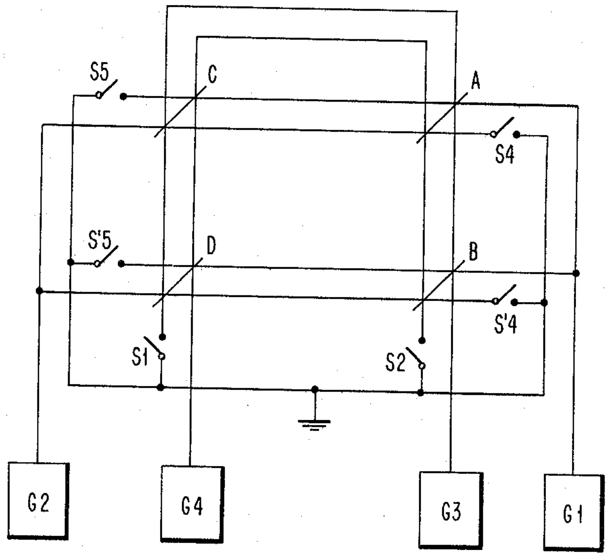
FIG. 5 is a simplified core matrix arrangement illustrating the manner of core selection for recording binary bits and for sensing previously recorded bits.

Referring to FIG. 5, four cores A, B, C, and D correspond to two successive binary orders, two of which (cores A and C) belong to number Y. Each row of words X and Y comprises in addition 30 other cores which are paired in the same manner as cores A and C, or B and C. The time needed to successively actuate the 32 columns of the core matrix and of the decoder is called the scanning cycle. The leads from pulse generators G1 and G2 traverse the 16 rows of the memory in opposing directions. Leads from G3 and G4, respectively traverse adjacent columns in opposing directions. The generators operate when one of the associated switches are on. In the present case, switches S4 and S5 are on at X time, switches S'4 and S'5 at Y time, and switches S1 and S2 at T1 time (see timing chart shown in FIG. 3). Current flows from the switches to the pulse generators and a 1 is recorded in a core when the current flows upwards in the column leads and from right to left in the row leads. Reading is accomplished by currents flowing in the reverse direction.

Figure 2A:
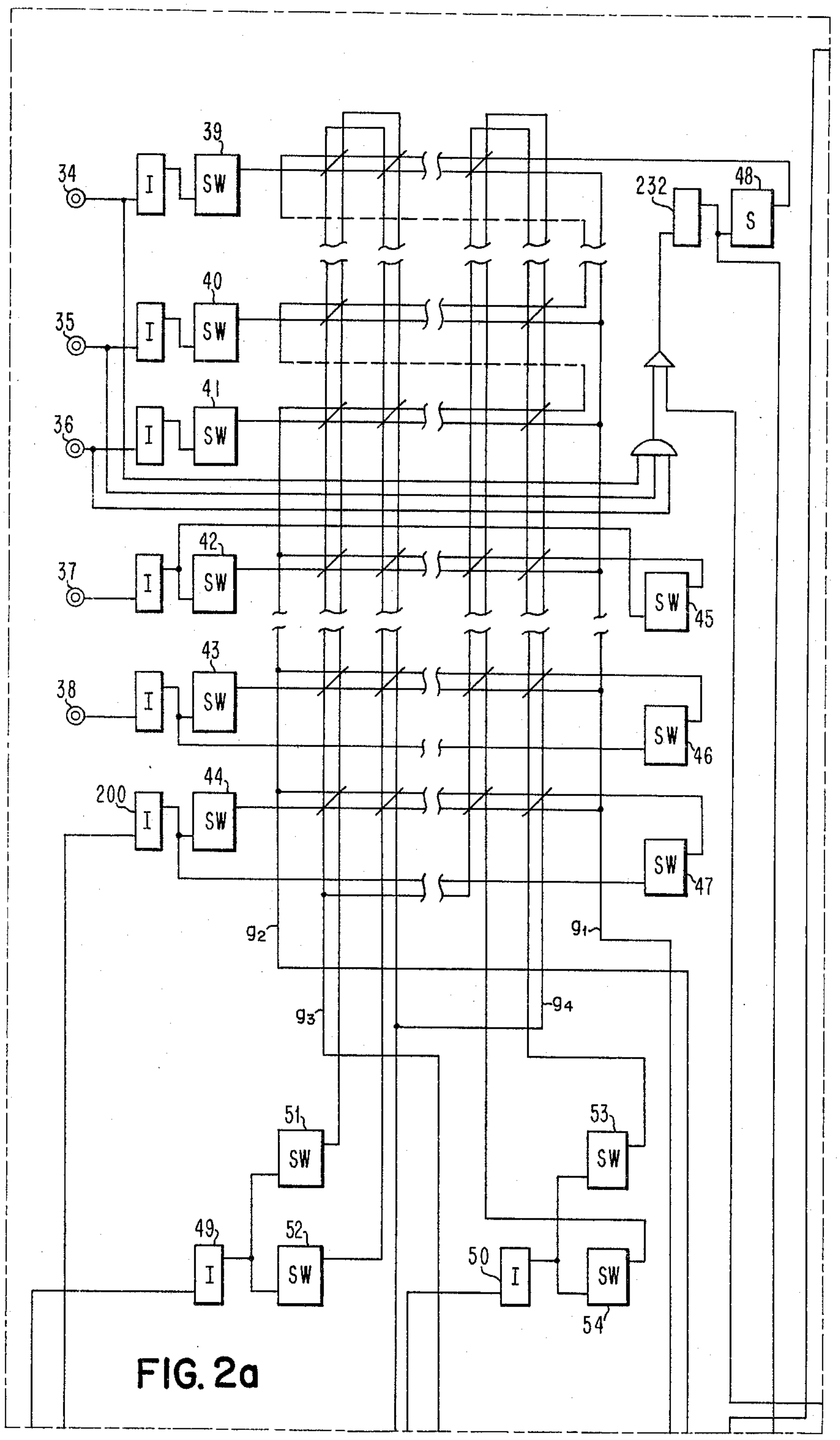
Figure 2B:
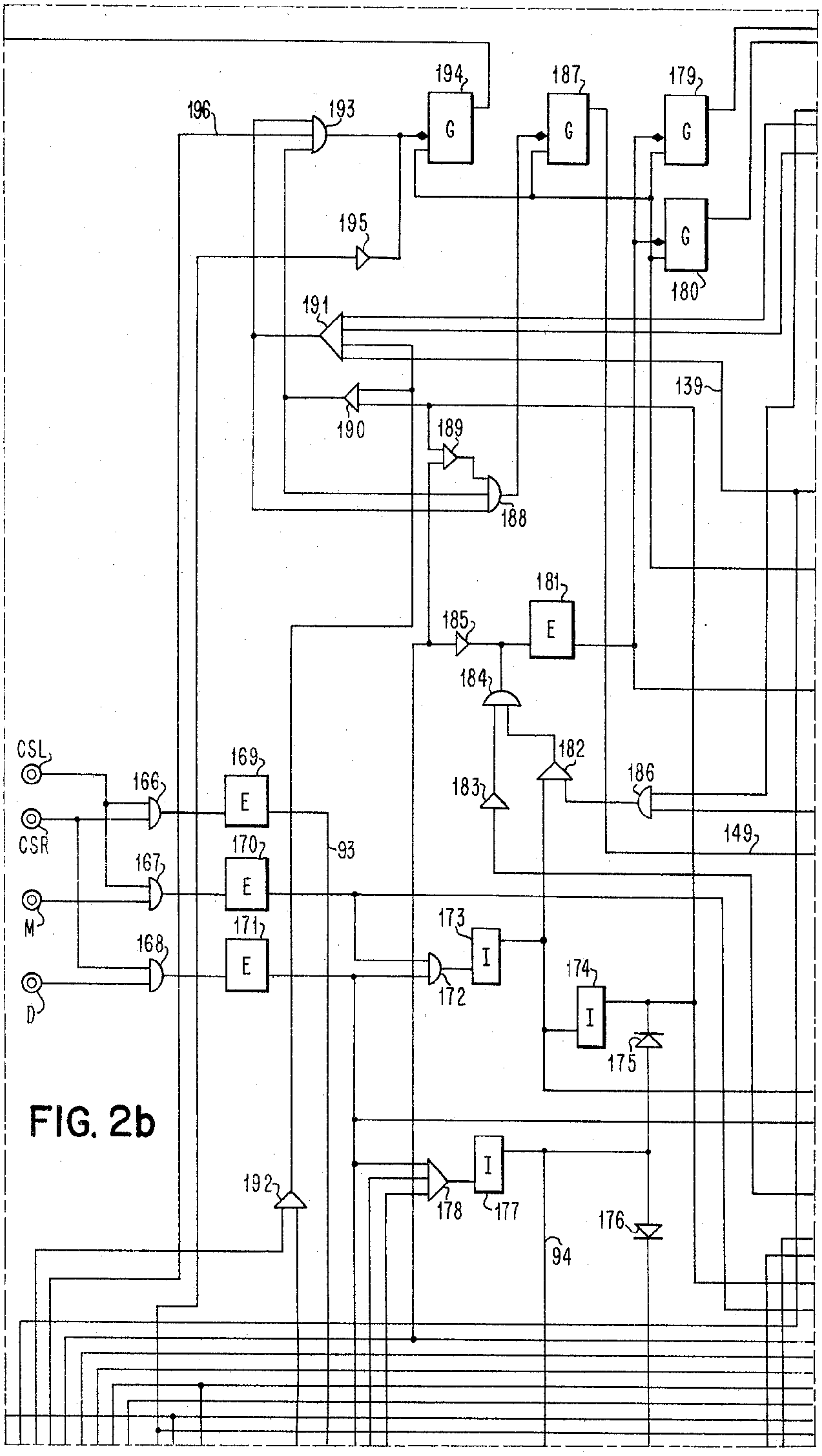
Figure 2C:
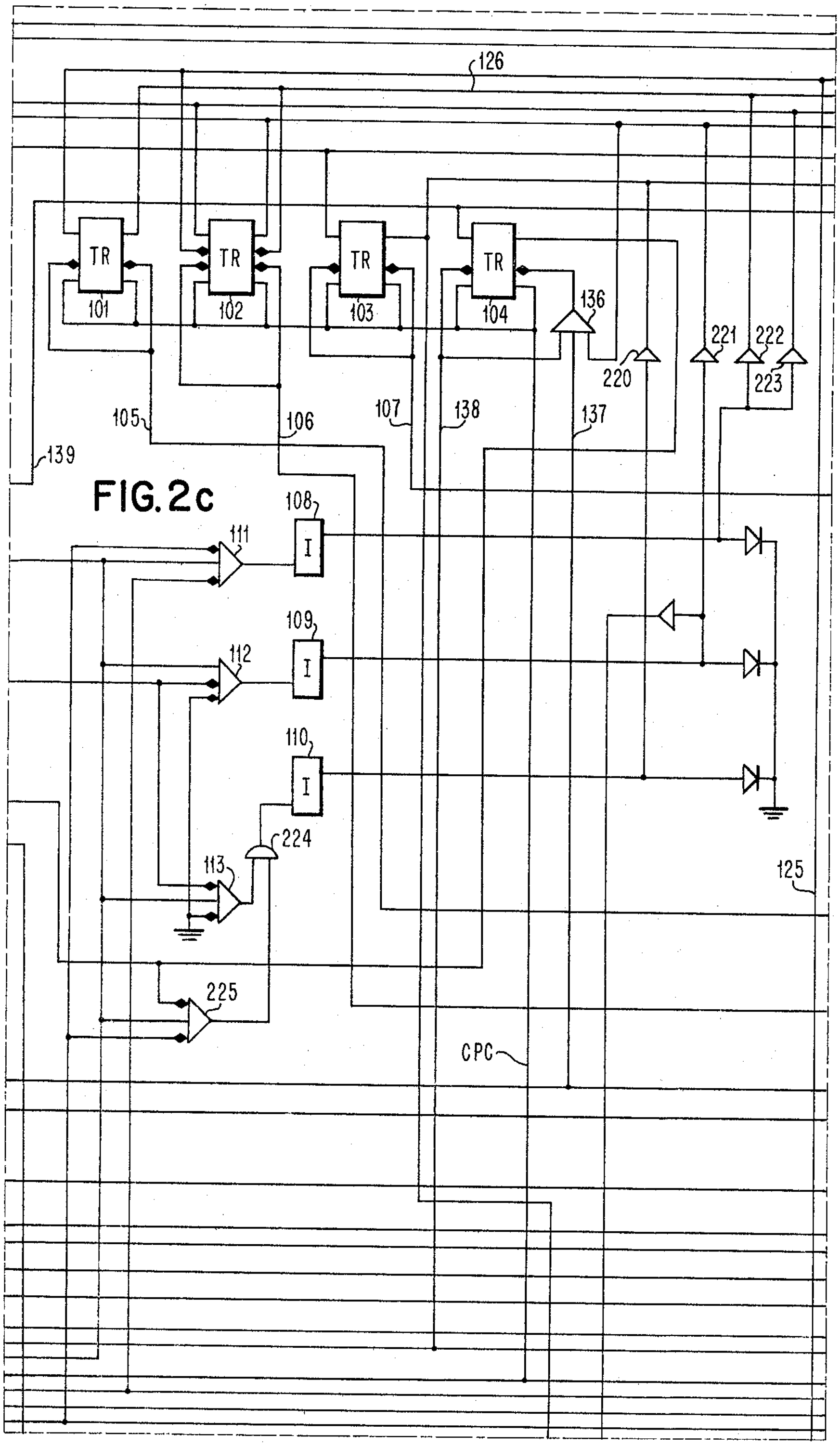
Figure 2D:
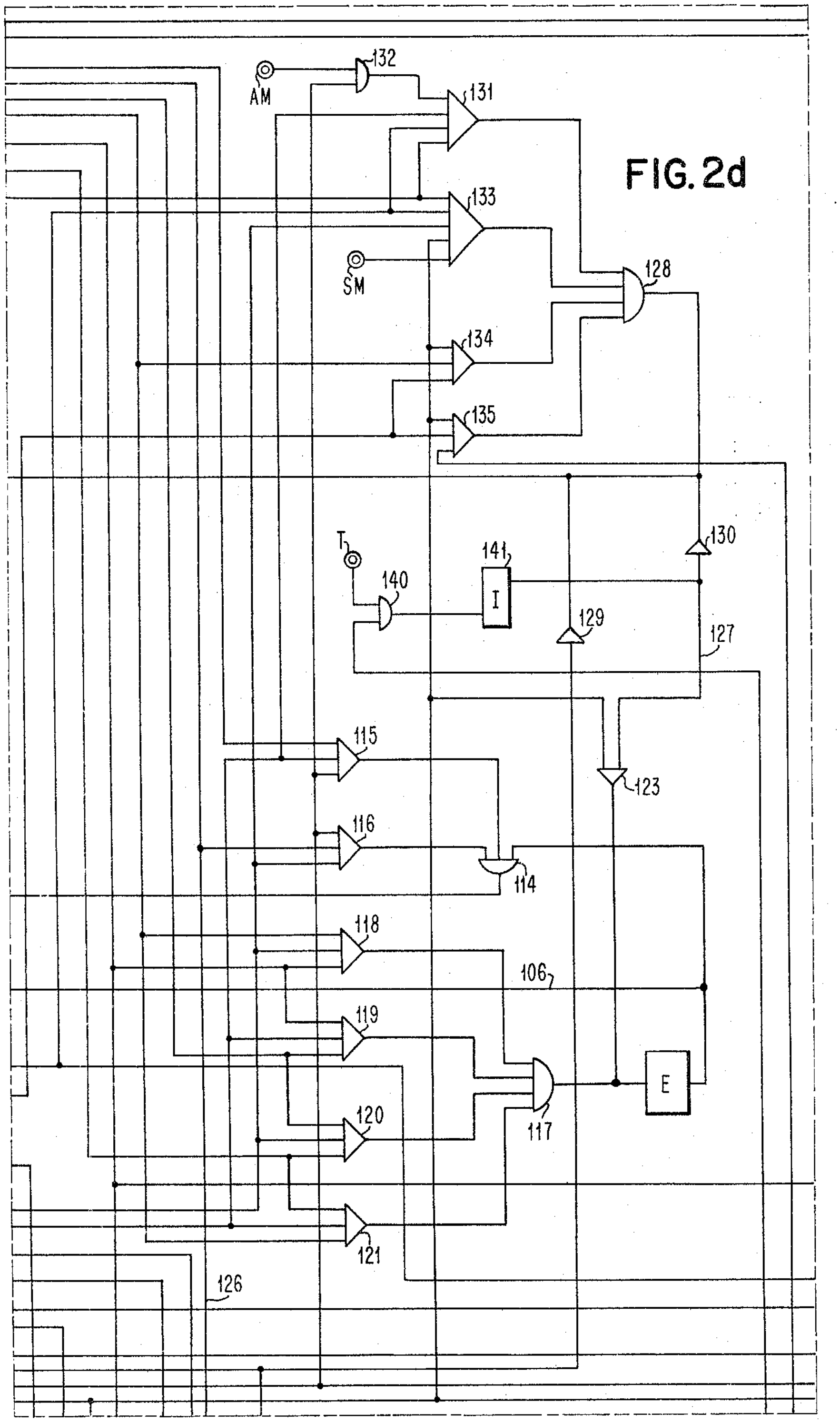
Figure 2E:
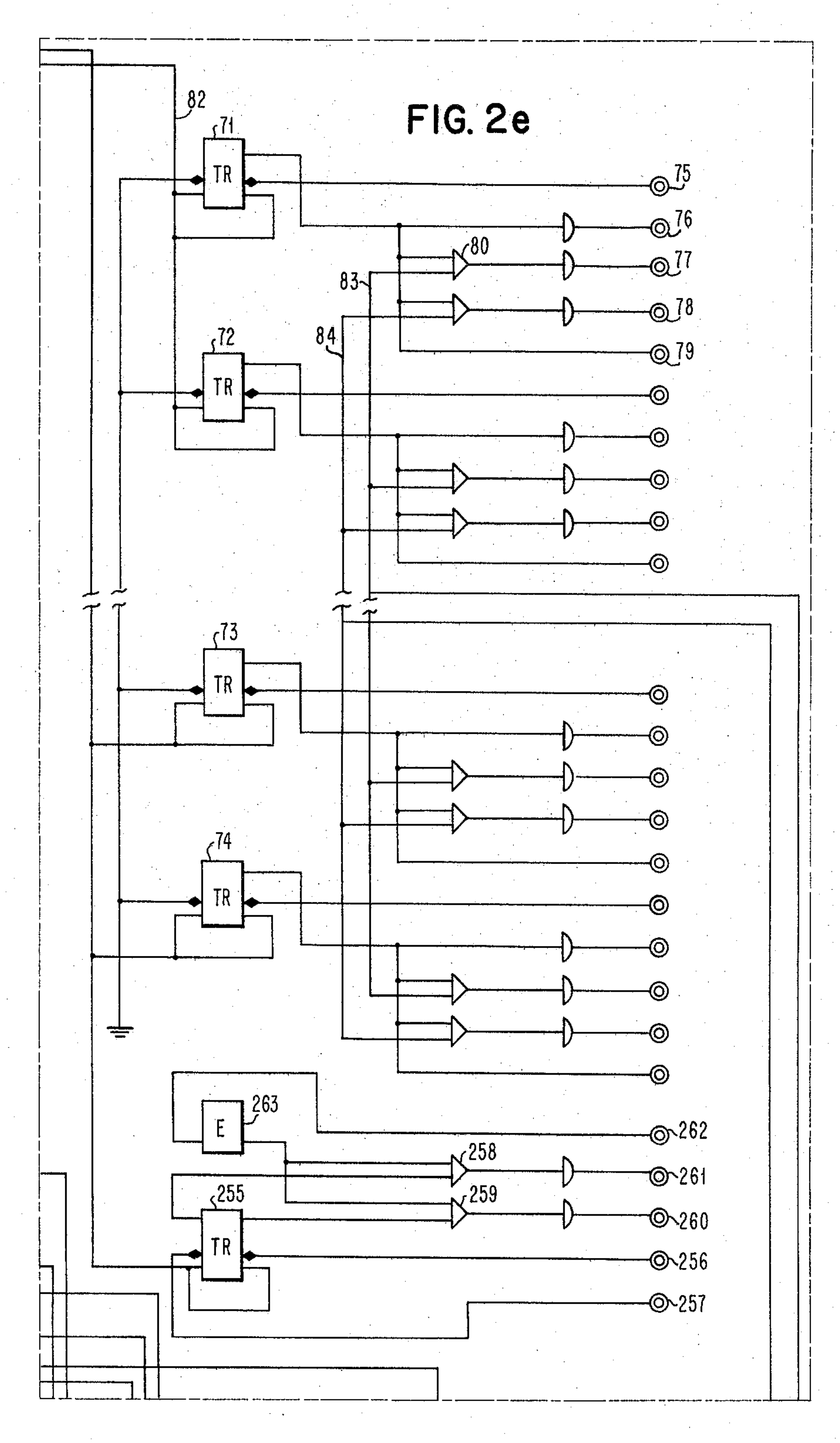
Figure 2F:
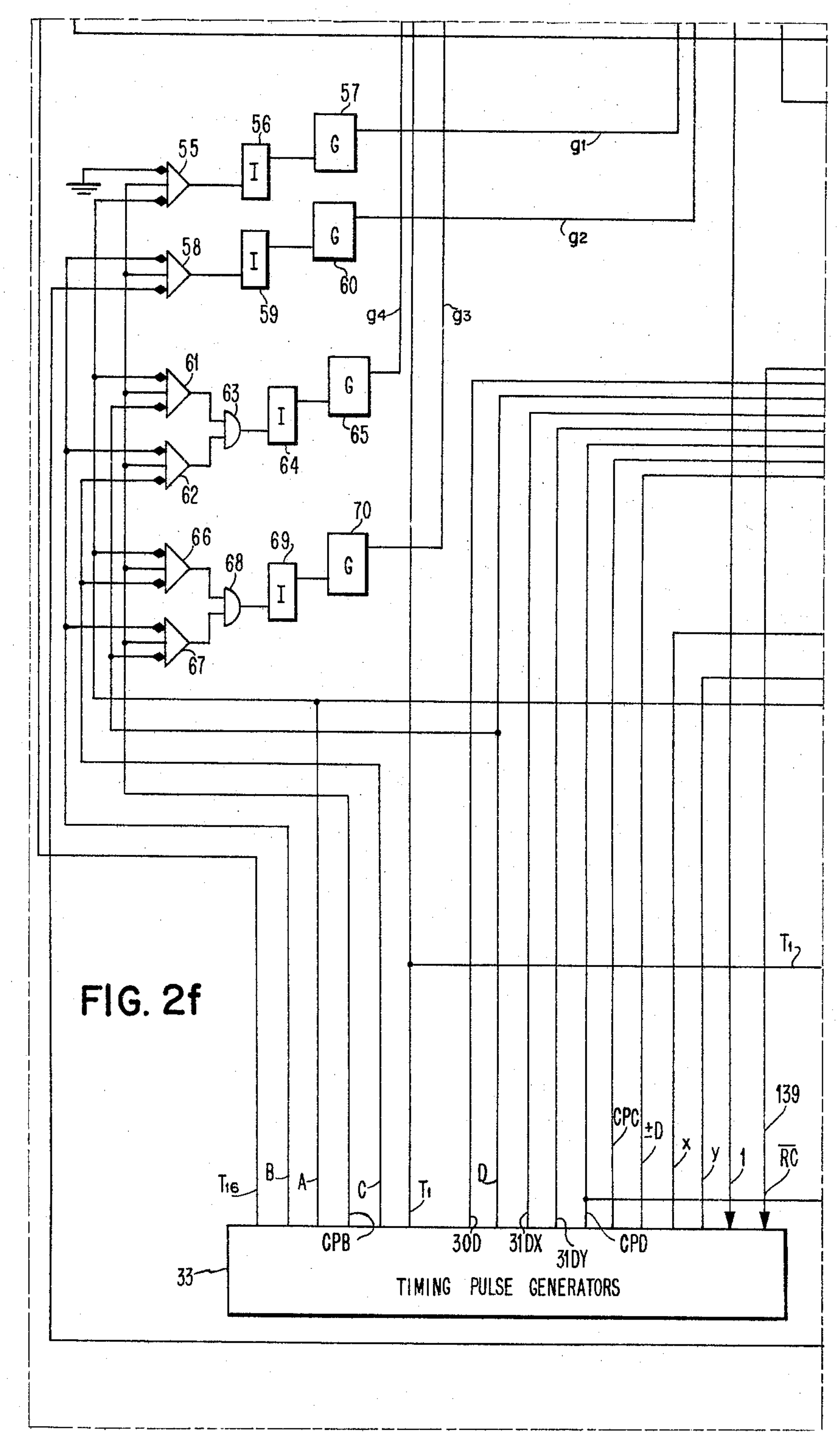

The timing diagrams *g*1, *g*2, *g*3, *g*4 (FIG. 3) indicate the currents provided by the pulse generators G1, G2, G3, G4, respectively, of FIG. 5 and FIG. 2*f*. Time T1 in FIG. 3 is the selection time of the first two columns of the core matrix and decoder. The diagrams and figures show that binary information is successively read and recorded in cores A, B, C and D.

For example, during time T1, switches S1 and S2 are closed. Since X time occurs first, switches S4 and S5 are closed, allowing the *g*1 pulse to flow from ground to 61 through switch S4 and core A from left to right. Similarly, the *g*3 pulse flows from ground to 63 through switch S1 and core A from top to bottom. This coincidence of *g*1 and *g*3 at core A performs a read operation on this core.

The next pulses are *g*2 and *g*4 from pulse generators 62 and 64. It can be seen that these pulses also coincide at core A, but in the opposite sense, thereby providing a record operation on this core.

These pulses also pass through core C, but do not affect it because the currents cancel. That is one pulse is in the read direction and the other time coincident pulse is in the record direction.

The operations proceed according to the same sequence during times T1, T2, . . . T16 which permits 32 columns of the core matrix storage and of the decoder to be scanned.

It is also seen that generator G1 provides row reading current pulses, generator G2 row recording current pulses, whereas generators G3 and G4 provide reading current pulses to the cores of one column and recording pulses to the cores of the following or preceding column.

Referring to FIG. 2*a*, the first two and the last two columns of the core matrix storage and decoder are shown, and three rows of the decoder and three rows of the memory. The switches of these rows 39–43, 45, 46 and 48 correspond to switches S4 and S5 in FIG. 5, and are turned ON by pulses applied to hubs 34, 35, 36, 37 and 38 appearing on the control panel. The switches 44 and 47 of the memory lower row has a special control, because this row contains a special word used in the multiplication and division. The row switches 39, 40 and 41 of the decoder and 42, 43, 44 of the memory close the circuits receiving reading pulses *g*1, whereas switches 45, 46, 47 and 48 control the circuits receiving recording pulses *g*2. The reading switches and recording switches of a memory row are operated oppositely by the same pulse so that both cannot be closed at once. There is but one recording switch 48 for the decoder, which is systematically closed whenever the decoder is addressed by a pulse at hub 34, 35 or 36.

In FIG. 2*a*, column leads include switches 52, and 53 (corresponding to S1 of FIG. 5) which control the circuits fed with pulses *g*3, and switches 51 and 54 corresponding to S2 (FIG. 5) controlling the circuits fed by pulses *g*4. Switches 51 and 52 are turned OFF by pulses T16 from the timing pulse generator, through a common inverter 49. Switches 53 and 54 by pulses T1 from the timing pulse generator through a common inverter 50.

Referring to FIG. 2*f*, block 33 represents the timing pulse circuits. The circuits at the top of the figure generate pulses *g*1, *g*2, *g*3, *g*4. AND circuits 55 receives pulses A and CPB, and its output is connected through inverter 56, to operate pulse generator 57 which provides read pulses to row leads *g*1.

AND circuits 58 receives pulses B, CPB and a recording control pulse, and is connected through inverter 59 to operate generator 60, which provides record pulses to row leads *g*2.

AND circuits 61 receives pulses CPB, A and D; AND circuit 62 receives pulses B, CPB and C. The outputs of AND circuits 61 and 62 are applied to OR circuit 63, which is connected to generator 65 through inverter 64. Pulses *g*3 are produced at the output of 70. Similarly, AND circuit 66 receives pulses A, CPB and C; AND circuit 67 receives pulses B, CPB, D and their outputs are applied through OR circuits 68 and inverter 69 to generator 80. Generator 65 delivers pulses *g*4.

COLLECTING CIRCUITS FOR READ PULSES

Figure 2G:
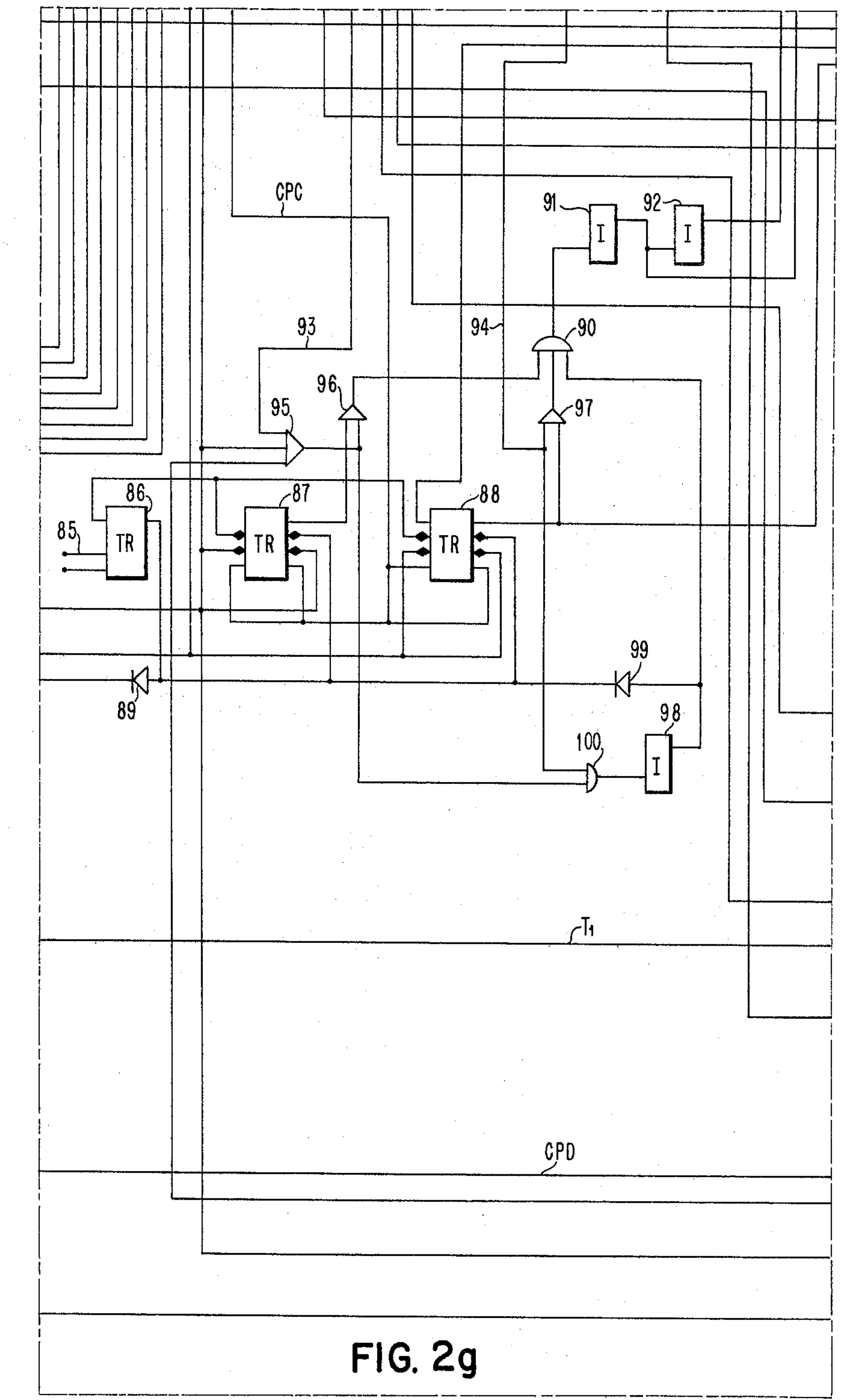

Referring to FIG. 2*g*, a sense winding common to the memory and the decoder is connected to terminals 85. When a 1 is read in a core, the resultant pulse is stored in a bistable multivibrator or trigger 86, the detailed circuit of which has not been represented, but which may be of any type known in the art.

The bistable multivibrator 86 is systematically *reset* (right output low) at the end of each reading cycle through diode 89, which receives A pulses from the timing pulse generator, and it is *inhibited* by this same diode from turning ON at recording time. The OFF output of the trigger 86 controls the ON gates of these triggers. Triggers 87 and 88 are used to delay by one digit time the information stored in trigger 86.

The right outputs of 86, 87, 88 are connected through diode 99 and AND circuits 96, 97 to the input or OR circuit 90, the output of which is connected to series connected inverters 91 and 92. If a positive pulse is produced at the output of 91, it is because the input was negative, therefore that there has not been any pulse on the sense winding (during the present or in the case of delay triggers 87 and 88 the immediately preceding digit time). The information provided by inverter 91, when the output is high, is called 0′. If a pulse is produced at the output of 92, it is because a 1 has been read in the scanned core, or in the case of delay triggers 87 and 88, the core scanned during the preceding digit time. The information provided by the inverter 92, when its output is high, is called 1′.

When the read pulse delay has been operated at X time through lead 93, which operates OR circuit 90 through AND circuits 95 and 96, or at Y time through lead 94, operating the same OR circuit 90 through AND circuit 97, trigger 86 cannot operate OR circuit 90 because of inverter 98, which prevents the pulse possibly produced at the output of trigger 86 from passing through diode 99. Inverter 98 is controlled by OR circuit 100, which receives the X delay control pulse through AND circuit 95 and the Y delay control pulse from line 94.

ADDING AND SUBTRACTING ARITHMETIC CIRCUITS

FIG. 2*c* shows the main elements of the arithmetic circuits. Trigger 101 acts as an accumulator and changes state in accordance with the voltage applied to its electronic gates through lead 105.

A 0 and 1 will designate the information data provided by the right and left outputs of accumulator trigger 101, respectively. This information is transferred to the recording control by leads 125 and 126, and is recorded in the cores at the end of each digit time.

A carry trigger 102 records the carries. Its condition depends both upon the carry control pulse, which is applied through lead 106 to two of its electronic gates, and on the condition of accumulator trigger 101, the right and left outputs of which are connected to the right and left gates of carry trigger 102, respectively. It provides at right and left outputs, respectively, an indication of a carry and no carry.

The add-subtract trigger 103 indicates whether the arithmetic operation on is an addition or a subtraction. It is conditioned by the addition-subtraction control applied through lead 107. Its left output is higher for an addition, and its right output is high for a subtraction.

Complement trigger 104 starts a complement correction cycle to correct the complement condition arising when the subtrahend exceeds the minuend. When high, the right and left outputs provide information data recomplement and not recomplement, respectively.

The four triggers 101, 102, 103, and 104 are switched by CPC pulses according to the voltages applied to their electronic gates, and are reset through inverters 108, 109 and 110 by CPD pulses under certain conditions discussed later.

FIG. 2*d* shows the circuits for determining the condition of triggers 101, 102 and 103. The gates of accumulator trigger 101 receive a pulse in the following cases corresponding to the inputs of OR circuit 114: The first case is a transfer occurring at the time X indicated by an output from AND circuit 123, through emitter follower 122 to OR circuit 114. This operation transfers information contained in inverter 91 or 92 by comparing these outputs with those of accumulator trigger 101 and changing the latter if they are different. A second case in which accumulator trigger 101 receives a CPC pulse is determined by AND circuit 115, the three inputs of which are $X=0$, Accumulator=1, and Y time. Another case is determined by AND circuits 116, the inputs of which are $X=1$, Accumulator=0, and X time. The other cases occur when the output of any one of AND circuits 118, 119, 120 or 121 is high, since this output passes through OR circuit 117 and is amplified by emitter follower 122 and applied to OR circuit 114.

The carry control pulse is the output of OR circuit 117, the four inputs of which are the outputs of AND circuits 118, 119, 120 and 121. AND circuit 118 is energized by a carry indication, 0′ and add. AND circuit 119 is energized by no carry, 1′ and add. AND circuit 120 is energized by no carry, 0′ and subtract; and AND circuit 121 is energized a carry indication, 0′ and subtract. The output of OR circuit 117, which is the carry control, is inhibited by the action of AND circuit 123 during X time, except in a special case when a control signal exists on lead 121 corresponding to a transfer operation.

Accumulator trigger 101, carry trigger 102 and the logical circuits determining their operation constitute a binary adder for adding or subtracting numbers X and Y. Comparing is done serially in the following sequences. A digit is read from an order of number X, then rerecorded, then the digit of the same order in number Y is read and the result of the operation of X on Y is recorded at Y, and so on for succeeding orders.

At X time AND circuits 115 and 116 cause accumulator trigger 101 to indicate the same digit as the selected read storage trigger. At Y time accumulator trigger 101 must perform the addition of three binary digits. The first digit which comes from word X and is stored in accumulator trigger 101, a second belongs to word Y and is indicated by the delay trigger, and the third is the carry resulting from the preceeding binary operation. Therefore, accumulator trigger 101 must be switched when, during an addition, $Y=1$ and there is no carry (AND circuit 119) or $Y=0$ and a carry exists (AND circuit 118.) Carry trigger 102 is OFF or turned OFF at Y time when an incoming bit turns on accumulator trigger 101. It is turned ON and left ON when an incoming bit turns OFF accumulator trigger 101. It is turned ON and left ON when an incoming bit turns OFF accumulator trigger 101. This is accomplished through a control with double gates, one pair of which receives the output voltage of OR circuit 117 through lead 106, and the other pair has on the left the 0 indication of accumulator trigger 107, and on the right, the indication 1. This actually corresponds to the arithmetic rule according to which there is no carry for 0+0 or 1+0, and a carry for 1+1.

SUBTRACTION

To subtract number X from Y, the 1's complement of Y is added to X, and the actual result is the 1's complement of the obtained result. The 1's complement of a word is obtained by replacing 0's by 1's and 1's by 0's. At X time accumulator trigger 101 records, through AND circuits 115 and 115', what is stored in the scanned core.

At Y time accumulator trigger 101 is switched according to the 1's complement of Y. The result obtained corresponds to 1's complement of the true difference $Y-X$. This result is recomplemented as it is returned to the core storage so that the true answer is retained.

For example, if the selected core contains a 0 and there is no carry from a previous order, AND circuit 120 is conditioned and the signal passes through OR circuit 117 to accumulator trigger 101, which changes state. This is contrary to the rule for straight binary addition and corresponds instead to addition of X and the 1's complement of Y.

Accumulator trigger 101 now contains the complement of the true difference $Y-X$. During record time a result is placed in the core storage, which is indicative of information on leads 125 and 126 connected to the 0 and 1 outputs respectively of accumulator trigger 101. Lead 125 is connected through AND circuit 230 to OR circuit 225. The output of OR circuit 225 is high when a 1 is to be recorded in the core storage, conversely, when a 0 is to be recorded into the core storage, the output of OR circuit 225 is low.

The core inputs to OR circuit 225 come from inverter 231, in turn energized from hubs 34, 35 and 36 through inverter 232; from AND circuit 235, conditioned only during a portion of the multiplication operation; from inverter 228, to be discussed later; from AND circuit 230, which is conditioned by a 0 in accumulator trigger 101, the subtract condition of trigger 103, and by Y time in combination with not sign time.

AND circuit 230 is one of the inputs to OR circuit 225, which may be conditioned during subtraction. It functions to store a 1 in the core storage when the following conditions are satisfied:

A 0 in accumulator trigger 101, Y time but not sign time, and the subtract condition of trigger 103. In this manner a 0 in accumulator trigger 101 is stored as a 1 and the recomplementing is accomplished.

A 1 in accumulator trigger 101 is not placed in the core storage because, during subtraction, inverter 228 is conditioned to clamp down the output of AND circuit 226 for the portion of Y time which is not sign time, therefore, even though this AND circuit might be conditioned to pass a signal, the output will not pass through OR circuit 225, since it is clamped by the output of inverter 228.

The operation of subtraction $$Y-X$$

is performed by storing the value of X in accumulator trigger 101 and adding to this the 1's complement of Y $$X+[(2^{n+1}-1)-Y]=(2^{n+1}-1)-Y+X$$

Recomplementing this sum produces the desired true result in core storage $$[2^{n+1}-1]-[(2^{n+1}-1)-Y+X]=\underline{\underline{Y-X}}$$

In the case where the subtrahend Y is smaller than the minuend X, the value of $2^{n+1}-1-X+Y$ exceeds the word capacity which is $2^{n+1}-1$, and a carry is produced at the end of the cycle. For example, in performing the operation $Y-X$, where $Y=19$ and $X=24$, the result appears in the accumulator as:

| | | | | | | |
|---|---|---|---|---|---|---|
| 24 | 1 | 1 | 0 | 0 | 0 | |
| 1's complement of 19 | 0 | 1 | 1 | 0 | 0 | +carry |
| | 0 | 0 | 1 | 0 | 0 | |

Since the 1's complement of the result is placed in the core storage it appears therein as 11011. To obtain the correct result in such a situation the number in storage must be recomplemented to produce 00100 and a 1 added, producing 00101, which is 5, the correct difference for the example problem.

The recomplement cycle is run in the following manner. Recomplement trigger 104 is turned ON by AND circuit 136, which has inputs corresponding to a carry, an indication through lead 137 that neither a multiplication nor a division is being made and an indication through lead 138 that point 31 CY, the end of a memory scanning cycle has been reached. When recomplement trigger 104 is ON, lead 139, connected from the left output to the timing pulse generators, goes low and eliminates X time, thereby recycling through Y time.

During sign time accumulator trigger 101 and carry trigger 102 are reset to 0 and no carry, respectively, through AND circuit 111 and inverter 108. Add-Subtract trigger 103 is reset to the add state through AND circuit 225 when recomplement trigger 104 is ON.

If a 1 is read at the beginning of the cycle, trigger 86 is set and the resultant pulse is transmitted through diode 99, OR circuit 90, inverters 91 and 92 to AND circuit 119. The other inputs to AND circuit 119, add and no carry, condition the circuit to transmit the pulse through OR circuit 117, emitter follower 122 and OR circuit 114 to accumulator trigger 101, setting it to indicate a 1. During the record portion of the cycle a 1 is a written into the core storage in the manner previously explained.

When the second bit of the example is read the recorded 1 operates trigger 86 to again produce an output pulse which passes through the same circuit to change accumulator trigger 101 from 1 to 0. During record time for the second digit, a 0 is written into the core storage. The second 1 had the effect of setting the carry trigger 102 to 1, since accumulator trigger 101 had conditioned the right hand side and line 106 was high as a result of the output from emitter follower 122.

The third bit being a 0 does not produce an output pulse from trigger 86, consequently, the output of inverter 91 is high and inverter 92 is low. The output of inverter 91, together with the carry and add indications, condition AND circuit 118 to pass a pulse which changes the state of accumulator trigger 101 from 0 to 1, and carry trigger 102 from 1 to 0. Therefore a 1 is stored during record time.

The fourth bit of the selected example is a 1. This produces an output pulse from inverter 92. When combined with no carry and add signals in AND circuit 119, the pulse changes the state of the accumulator trigger 101 from 1 to 0. A 0 is therefore recorded in core storage for this position.

The fifth bit of the example is also a 1 and produces an output from inverter 92. However, carry trigger 102 still indicates a carry, and therefore neither AND circuit 118 or 119 passes a pulse and a 0 is recorded in core storage.

The number which has been written into storage is 00101 or −5, which is the correct answer for the operation 19–24.

It will be recognized that the above described operation may also be described as adding 1 to the stored number and the recomplementing, while accommodating any carries which may be generated due to adding the 1. This is accomplished through a control with double gates, one pair of which receives the output voltage of OR circuit 117 through lead 106, and the other pair has on the left the indication 0 of the accumulator, on the right, the indication of 1. This actually corresponds to the arithmetic rule according to which there is no carry for 0+0 or 1+0, and a carry for 1+1.

ADDITION OR SUBTRACTION CONTROL

This control signal is the output of OR circuit 128, which is operative only at the sign time, since during the other times it is inhibited by the low level of the voltage applied to AND 129, FIG. 2*d*. This signal is also inhibited on a transfer operation by hub T through inverter 141 and AND 130.

OR circuit 128 is conditioned by the output of AND circuits 131, 133, 134, 135. Hub AM which is one input to OR circuit 132, and hub SM which is connected to an input of AND circuit 133, are energized by program steps for an addition or a subtraction, respectively.

The condition of the add-subtract trigger 103 causes either operation to be effected. When trigger 103 is OFF, it provides for the addition of the absolute values of X and Y; when it is ON, it provides for the addition of X with the 1's complement of Y. Its condition is determined by the operation control indicated by the program step and the respective signs of X and Y. Thus, several cases may be encountered. Before studying them, let it be recalled that in the memory the minus sign is recorded as a 1 and the plus sign as a 0, in the first binary position.

Add-subtract trigger 103 is conditioned at X time by the output of AND circuit 131. The inputs to AND circuit 131 are X time or hub AM, through OR circuit 132, a 1 from inverter 92, not multiply or divide, and not recomplement.

At Y time during a subtraction, add-subtract trigger 103 is conditioned by the output of AND circuit 133 which has inputs; not recomplement, not multiply or divide, a 0 from inverter 91, Y time and hub SM.

AND circuit 134 conditions trigger 103 during Y time when carry trigger 102 indicates the existence of a carry during a divide operation.

AND circuit 135 operates to condition 103 during the first cycle of time for a division operation.

The following chart illustrates the operation of trigger 103 for addition and subtraction of various combinations of the sign of X and Y. Since trigger 103 can be conditioned to change at sign X or sign Y time both possibilities are shown in the chart.

TRIGGER 103

| Operation | Sign X | Sign Y | X Time | Y Time |
|---|---|---|---|---|
| Addition | + | + | | |
| Addition | + | − | | Conditioned. |
| Addition | − | + | Conditioned | |
| Addition | − | − | Conditioned | Conditioned. |
| Subtraction | + | + | | Conditioned. |
| Subtraction | + | − | | |
| Subtraction | − | + | Conditioned | Conditioned. |
| Subtraction | − | − | Conditioned | |

As an example of the circuit operation assume that a positive value of X is to be added to a positive value of Y. At sign X time a 0 is read which leaves accumulator trigger 101 and add-subtract trigger 103 in the OFF condition. The sign of Y is also read as 0 which leaves these triggers OFF. Since the add-subtract trigger 103 is in the OFF condition, addition is performed as has been previously described.

For the case of subtraction $Y-X$, where Y is positive and X is negative, the result is somewhat different. The negative sign of X sets the accumulator trigger 101 to 1 through AND circuit 119 and add-subtract trigger 103 to OFF. The positive sign of Y turns OFF accumulator trigger 101 because of the subtract operation but trigger 103 is not changed by the 0 representing the positive sign of Y. The subtract operation is then effected with the temporary negative sign. If Y is greater than X, the sign is correct. When Y is smaller than X, the carry at the end of the cycle starts a recomplement cycle which changes the sign.

It may be seen that for subtraction, the reading of the sign of X is the same as for the addition, control of the add-subtract trigger 103 being determined by AND circuit 131. However, the readout of the sign of Y determines the condition of trigger 103 in the opposite way as that used for the addition, through the control provided by AND circuit 133, which causes trigger 103 to be switched when the sign of Y is positive. As in the case of addition, the momentary sign is always that of Y; if that sign is erroneous, it is corrected during a complement cycle.

TRANSFER OF THE INFORMATION FROM ONE CORE STORAGE LOCATION TO ANOTHER

For transfer, the core storage location of the number to be transferred is scanned at X time and the receiving address at Y time. The corresponding program step applies to a pulse at hub T, FIG. 2*d*. The accumulator normally records the X word at the time X, bit by bit, with the word being regenerated in storage at the recording time. At Y time the transfer hub T inhibits, through OR circuit 140, inverter 141, and diode 130, the control of triggers 101, 102 and 103. The triggers cannot therefore be altered during Y time, and thus what has been read from X is recorded at Y.

PRINCIPLE OF THE MULTIPLICATION AND THE DIVISION

For a multiplication, three locations are used, W1, W2, and W3. At the beginning of the multiplication, the multiplier is in W2 and the multiplicand in W1. At the end of an operation, the product is in W2, but if the product is too great, the digits of the higher orders are stored in location W3.

The multiplication is made through several cycles. During the first cycle, the signs of the multiplicand and of the multiplier are added to provide that of the product and the multiplier is transferred to location W3. Then, during the second and all following even cycles, a shift to the left is made in W3, and the information of the highest order is analyzed. For the subsequent odd cycles, a shift is made in location W2, and if a 1 has been analyzed during the preceding even cycle, the multiplicand stored in location W1 is added thereto. This results in successively adding partial products as is made in a manual multiplication, but they are effected according to the decreasing orders of the multiplier. To add a partial product to the previous ones, the memory must be scanned twice, once to shift number W3 and add into W3 the overflows possible in the addition of W1 to W2 and the shift of W2, another time to shift number W2 and add or not add the multiplicand thereto, according to the indication given by the multiplier during the preceding cycle.

Each multiplication thus requires a number of cycles equal to two more than twice the number of binary orders stored in the memory, in this case 62 cycles.

For the division, three core locations are also needed, W1, W2, and W3. At the beginning of the division, the divisor is in W1, the dividend in W2 and possibly, if there is an overflow, in W3. At the end of the operation, the divisor is still in W1, the quotient in W2 and the remainder in W3.

The division principle consists in successively subtracting from the dividend the divisor multiplied by the suitable relatively decreasing powers of 2, beginning with the higher orders of the dividend. If the subtraction is arithmetically possible a 1 is recorded in the corresponding order of the quotient.

If the subtraction of the divisor multiplied by a power of 2, that is, $D\times 2^n$, is not possible, it would be necessary, before subtracting $D\times 2^{n-1}$ to re-add $D\times 2^{n}$, since the subtraction of that number has already taken place. In the herein described device, the two operations are made at one time by adding $D\times 2^{n-1}$.

The division is effected in several cycles which run as follows:

During the first cycle, the signs are added to get that of the quotient, and the portion of the dividend stored in word 2 is shifted toward the left.

During the second cycle, the divisor stored in W1 is subtracted from the portion of the dividend stored in W3, shifted one position to the left.

If the subtraction effected during the second cycle is possible, the next following even cycle is similar to the second one. If the subtraction is not possible, the divisor is added to number W3, shifted one position to the left as has been explained previously, and so on from an even cycle to the next.

During the odd cycles, one shifts to the left number W2 which stores, in the higher binary locations, the lower orders of the dividend not yet entered into location W3, and in the lower binary locations the higher orders of the quotient. Moreover, according to whether the operation effected during the preceding cycle has been possible or not, a 1 or 0 is recorded in the lower order of W2.

During the last scanning cycle, the number stored in W3 is not shifted. If an overdraw has occurred, the divisor will be added without shift. As in the case of multiplication, division requires 62 cycles.

Figure 2H:
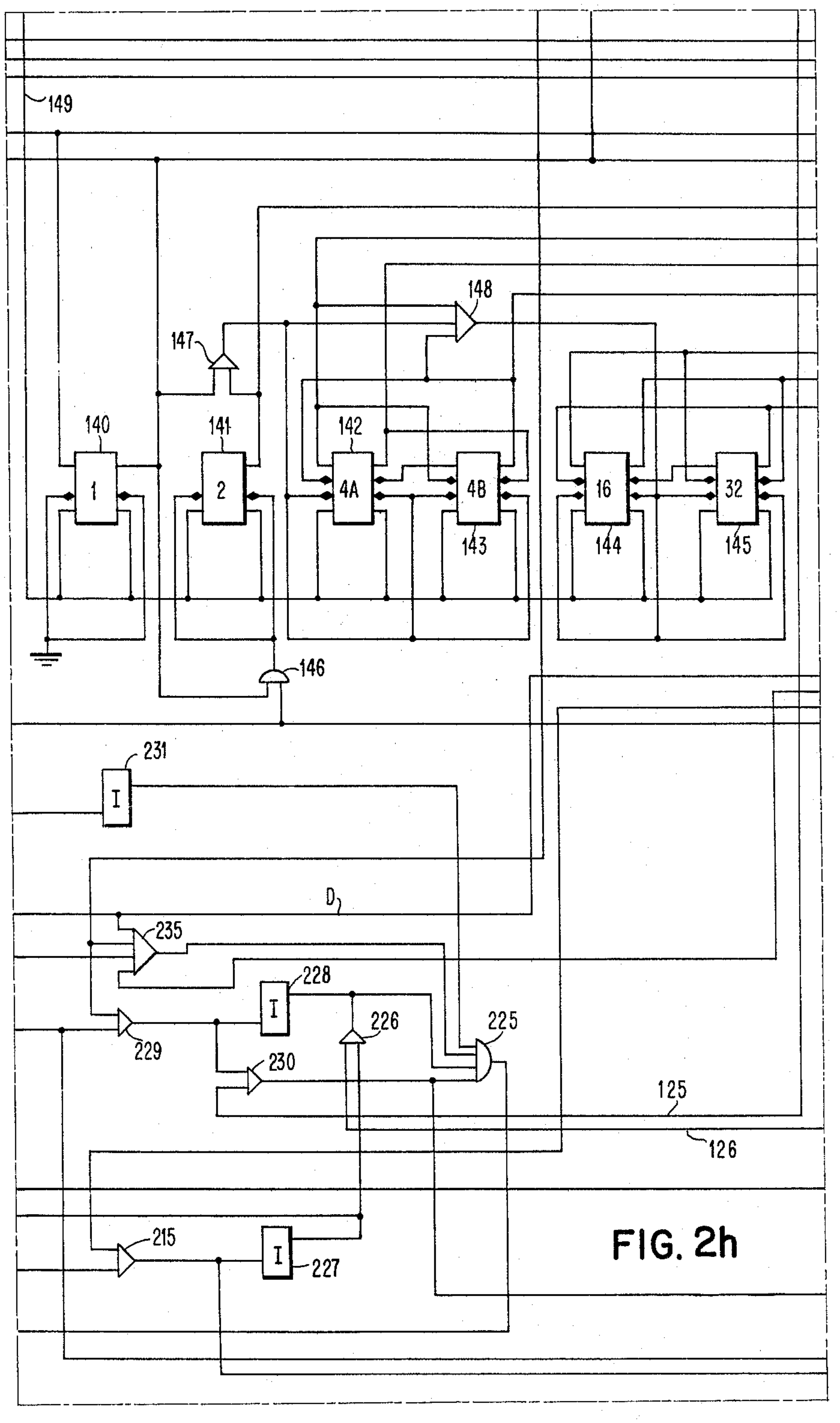
Figure 4:
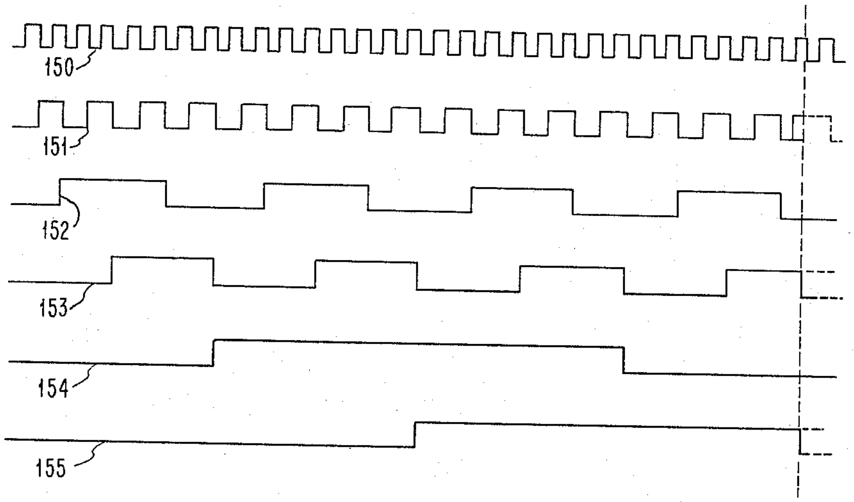
FIG. 4 is a timing diagram for a counter of this device.

A tertiary counter for counting the 62 cycles is shown in FIG. 2*h* and comprises triggers 140, 141, 142, 143, 144 and 145. The right output of 140 is connected to both gates of 141 through OR circuit 146, so that both triggers count, according to the usual binary system, the the pulses appearing on lead 149. The right outputs of triggers 140 and 141 constitute the inputs of AND circuit 147, the output of which is related to one of the gate pairs of triggers 142 and 143. The right and left outputs of 142 are connected to the right and left gates of 143, respectively, and the right and left outputs of 143 are connected to the left and right gates of 141. Triggers 144 and 145 are similarly interconnected and their other gates are connected to the output of AND circuit 148, the inputs of which are energized by the output of AND circuit 147, the left output of 142, and the right output of 143. Omitting the control applied to the OR circuit 146, the counter such as it has just been described, shows the 64 conditions indicated in the timing chart of FIG. 4, wherein 150, 151, 152, 153, 154 and 155 represent the right output voltages of triggers 140, 141, 142, 143, 144, and 145. As 62 cycles only are needed, the last two cycles are eliminated by means of a control signal from OR circuit 146 through lead 156, which is high on the sixty-first and sixty-second cycles of the counter. Thus, on the sixty-first cycle, trigger 141 is ON before being turned ON by trigger 140. This causes a pulse to appear at the output of AND circuits 147 and 148, which resets triggers 142 and 144 on the sixty-second pulse before the sixty-fourth.

Figure 2I:
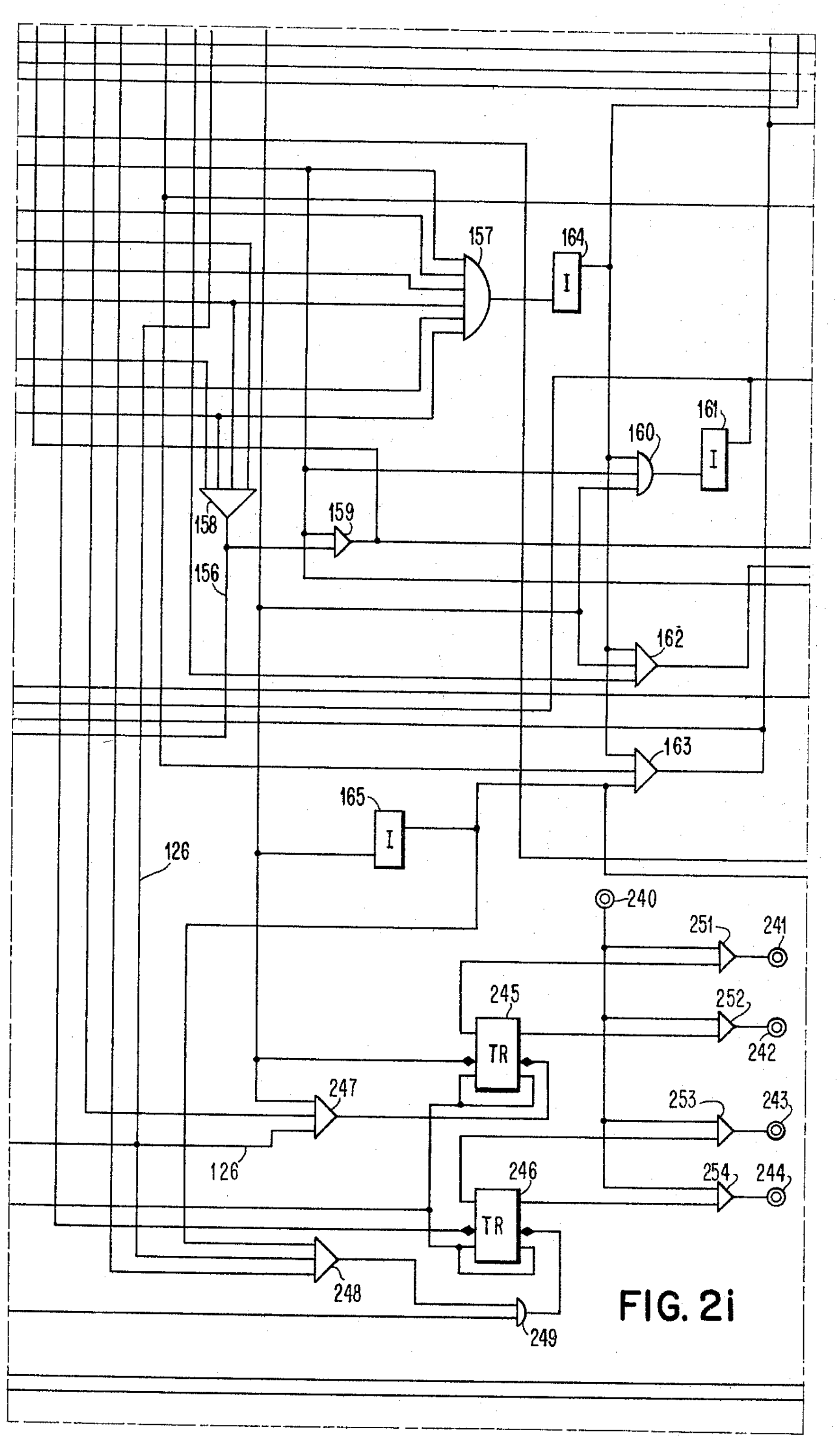

The output circuits of the counter are represented at the top of FIG. 2*i*. The right outputs of the counter triggers constitute the inputs to circuit 157, so that the output signal of inverter 164 is high when all the triggers are OFF, that is, during the first cycle of the counter.

The inputs of AND circuit 158 are connected to the left outputs of triggers 142 and 144, and the right outputs of triggers 143 and 145, so that the output is high during the sixty-first and sixty-second cycles.

The inputs of AND circuit 159 are connected to the output of AND circuit 158, and the right output of trigger 140. The output of AND circuit 159 is high during the sixty-second cycle of the counter.

The inputs of OR circuit 160 are connected to the output put of inverter 164, the right output of trigger 140 and the pulse corresponding to the sign time for each cycle. Therefore inverter 161 has an output voltage which is high for all odd cycles between the third and sixty-first cycles, inclusive.

AND circuit 162 is conditioned by signals which are high during the first cycle of the counter, during the sign time, and when there is a multiplication-division control. The output therefore determines the moment when it is necessary to record the sign of the product or of the quotient.

AND circuit 163 receives signals from the multiplication control, the output of inverter 164 and the inverted sign time signal from inverter 165. AND circuit 163 will have a high output during the first multiplication cycle, except for the sign time.

MULTIPLICATION AND DIVISION CONTROL CIRCUIT

The lower part of FIG. 2*b* represents multiplication and and division control circuits. Hubs D, M, CSR, CSL, respectively, correspond to the operations of division, multiplication, and column shifting to the right or to the left. The two latter operations are actually a multiplication or a division by a power of 10.

Hubs CSL and M are connected to the inputs of OR circuit 167, the output of which is connected to emitter-follower 170. Hubs CSR and C are connected to OR circuit 168, the output of which is connected to the input of emitter-follower 171. Hubs CSL and CSR are connected to the inputs of OR circuit 166, the output of which is connected to emitter-follower 169. The outputs of the emitter-followers 170 and 171 constitute the multiplication (M) and division (D) information, respectively. OR circuit 172 and inverter 173 deliver the information "No multiplication or division."

INFORMATION X AND Y DELAY CONTROL

Hubs CSL and CSR are connected to OR circuit 166, the output of which is applied to emitter-follower 169. The output of this emitter-follower provides for the delay by one bit time of the information scanned during time X. To shift in a word, the decimal information controlled by hubs CSL and CSR the word is multiplied or divided by a power of 10. To accomplish this, a magnetic core decoder is used which stores in its rows the various powers of 10 expressed in the binary system but shifted one binary position to the right, as described in the copending application Serial No. 738,199, supra. In such decimal shifting operations, the multiplier or the divisor is a word of the decoder, and the bits must be delayed by a bit time, because of the recording shift of the power of 10. As the words of the decoder are always scanned at time X, the shifting instruction provides, through lead 93, a delay of one bit time for the information read at X time.

On the other hand, at Y time, when there is a multiplication or division control, a signal is applied through lead 94 to control a delay of the information read from Y time through diode 175, except however for the case when the output of inverter 177 is low, that is, when the output of AND circuit 178 is high during the last division cycle. This systematic delay in Y is used to shift the bits stored in W2 and W3 for a multiplication or division, except for the special case of the last cycle pointed out in relation to the division operation.

*Program Advance*

FIG. 2*b* illustrates program advance. Pulse generators 179 and 180 provide program advance pulses. The generation of a pulse is started when they are gated by the output of emitter-follower 181 and a CPD pulse. Its input is high at 31DX, the end of the scanning cycle, which occurs only on the sixty-second cycle for the multiplication or the division, or in the other cases, when there is no carry (end of addition or subtraction without complement cycle) or when a complement cycle has been effected (subtraction). Such conditions are sensed through OR circuit 184, the output of which is conditioned by AND circuit 185 which receives a pulse at time 31DX, and by the outputs of AND circuits 182 or the diode 183. The output of AND circuit 183 is high during the sixty-second multiplication or division cycle, the output of AND circuit 182 is conditioned by OR circuit 186, the inputs of which indicate that there is no carry or complement cycle.

*Counter advance*

In FIG. 2*b*, generator 187 delivers counter advance pulses. The pulses are generated in response to pulses CPD when the electronic gate is conditioned. The counter advances one location at the end of odd cycles at time 30D, through the control pulse received by AND circuits 190 and 191, and at the end of the even cycles, at time 31DX by the control pulse received from AND circuit 189, the outputs of AND circuit 189 and 191 being the inputs of OR circuit 188. One input of each AND circuit 190 and 191 consists of the output of AND circuit 192, a time pulse 30D is applied to one input while the other input is connected to the left output of the first multivibrator of the tertiary counter, which is high during the odd cycles. During the odd cycles, point 31D is then eliminated, as well as the sign time of the following cycles so as to permit the progressive transfer to the information from location 2 to location 3 during these cycles.

*Primary chain control*

A primary chain control is provided by the output of OR circuit 193, which operates the electronic gate of the pulse generator 194. This gate is further conditioned by AND gate 195, and allows the output to be high only at Y time. The primary chain normally advances at the odd points of Y time, because of the control signal applied through lead 196. The outputs of AND circuits 190 and 191 are connected to the inputs of OR circuit 193 and control the advance of the primary ring to eliminate the sign time of the even cycles in two particular cases: first, when an addition is performed in which there is an overflow, the carry is then entered in the special word; and, second, at the end of odd cycles for a multiplication or a division. In both cases the sign core of the special word is not addressed.

*Selection during multiplication and division of W1, W2 and W3*

Figure 2J:
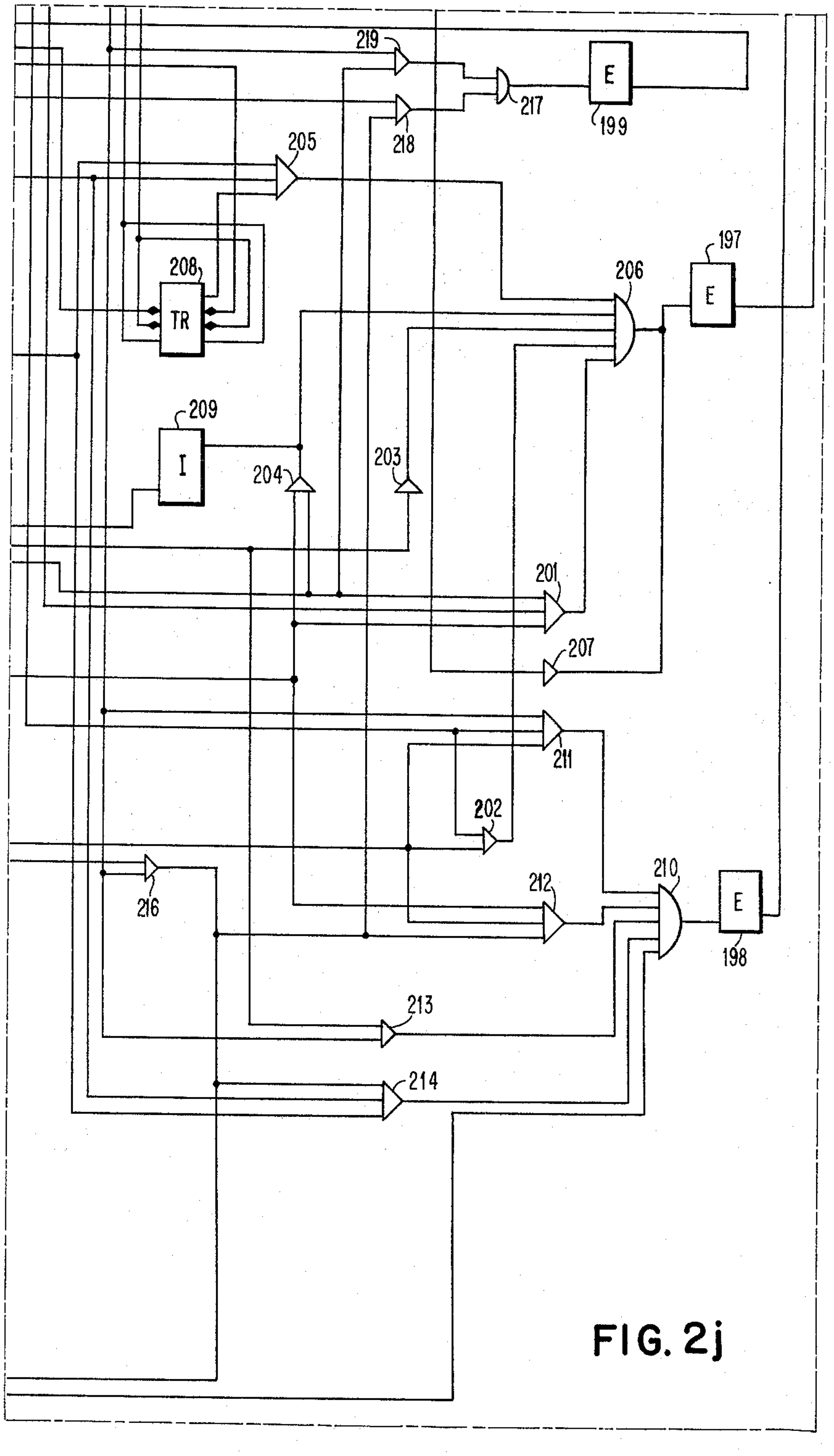

Referring to FIG. 2*j*, the scanning control signals result from the outputs of emitter-followers 197, 198, and 199 for the locations scanned in X, Y and for the special location, respectively. The output of the emitter-follower 199 is directly connected to inverter 200 (FIG. 2*a*), which controls the switches of the horizontal leads of a word in the memory, for the special word is always the same whatever the operation may be. The outputs of the emitter-follower 197 and 198 are applied to the AND circuits controlling the hubs, such as 77 and 78 of the program steps (FIG. 2*e*).

Hubs 77 and 78 (FIG. 2*e*) are each externally connected to the input hub of a memory location, such as 37 and 38 (FIG. 2*a*), under control of emitter-followers 197 and 198 (FIG. 2*j*) and from the right output of the triggers of the operated program step. All or part of the selected locations of the memory are scanned at the suitable times through the operated program step and the control panel.

Consider the conditions wherein the scanning of a location is controlled at X times. There are five possibilities corresponding to the outputs of AND circuits 201, 202, 203, 204, 205 (FIG. 2*j*) which constitute the inputs of OR circuit 206 connected to emitter-follower 197. Because of diode 207, the output of OR circuit 206 can be high only at X time.

AND circuit 202 systematically determines a scanning control at X time for the operations that are neither multiplication nor division, an input being constituted by the left output of the first counter trigger, which is always high in such a case, and the other by the control not multiplication or division.

Inhibit AND circuit 203 transmits the information indicating the sign time of the first multiplication or division cycle, this information being provided by AND circuit 162. Meanwhile, the signs of numbers W1 and W2 are added to get that of the product or of the quotient. AND circuit 205 causes location W1 to be scanned at X time for a multiplication. This scanning occurs when it is desired to add the multiplicand to the number stored in W2, that is, during the odd cycles following a cycle wherein a 1 has been read from the highest order of number W3. Trigger 208 delivers this information. Location W3 is scanned at Y time of the even cycles. It has been seen that, for a multiplication, there is a systematic control to delay one bit time the information read at Y times. When a 1 has been read at point 30, trigger 88 (FIG. 2*g*) is turned ON. At point 31DX the two right gates of trigger 208 are raised and pulse CPC turns it ON. The right output is connected to an input of AND circuit 205 (FIG. 2*j*) another input of which indicates that a multiplication is being made, and the third is up during the odd cycles between the third and the sixty-first cycles, inclusive.

AND circuits 204 and 201 (FIG. 2*j*) control the scanning of location W1 (divisor) for a division. During all even cycles, except the last one for a division, the divisor is added to or subtracted from the content of location W3; during the last cycle (the sixty-second) an operation is effected only if the latter is an addition. The scanning of W1 is systematically controlled by AND circuit 204, one input of which is high during the even cycles, and the other input provides the division information. The input of inverter 209 is high and the output is low during the sixty-second cycle, and, therefore, at that moment, the divisor is prevented from being scanned. If, however, during the sixty-second cycle, the divisor is to be added to the number stored in W3, the three inputs of AND circuit 201 (FIG. 2*j*) are high. The first of these inputs provides the division information, the other one is high when the addition-subtraction trigger is set to add, and the third one indicates the even cycles. Therefore location W1 is scanned during the sixty-second cycle only when an addition is to be done.

The location scanning at Y time is determined by the output of OR circuit 210 (FIG. 2*j*), the inputs to which consist of the outputs of AND circuits 211, 212, 213, 214 and 215.

The inputs to AND circuit 211 are high, at Y time when the operation to be effected is neither a multiplication nor a division, and when the trigger 140 (FIG. 2*h*) of the counter is OFF. All these conditions insure scanning of the Y word for an addition and a subtraction.

The inputs of AND circuit 213 (FIG. 2*j*) are high at sign time of the first multiplication or division cycle, and at Y time. This allows addition of the sign of W1 to the sign of W2 to get the sign of the product or of the quotient.

AND circuit 214 causes the scanning of location W2 for a multiplication, to record progressively the product therein. This is effected during the odd cycles, except during the sign time. This scanning is controlled by the input of AND circuit 214 from inverter 161, the two other inputs being high respectively for a multiplication and Y time, the sign time being excluded.

AND circuit 212 causes word W2 to be scanned in a division to progressively record the quotient therein, and transfer successively shifted digits of the dividend into word W3. This is effected during the odd cycles, except at the sign time. The three inputs of AND circuit 212 are high, one when the program calls for division, another connected to the OFF (add) output of the first trigger of the tertiary counter during the odd cycles, and the third one to the output of AND circuit 216, which is high during Y time, except at the sign time.

AND circuit 215 (FIG. 2*h*) has one high input at X time, while the other is high for all but the sign time of the first multiplication cycle. This permits transferring the content of W2 to W3, which is a transfer of the multiplier into the special word reserved for it.

OR circuit 217 causes W3 to be scanned in two cases corresponding to AND circuits 218 and 219. AND circuit 218 provides a signal at Y time, except during the sign time of the first multiplication cycle, in order to transfer the content of W2 to W3. AND circuit 219 has one input connected to the right side of counter trigger 140 and is high during odd cycles, and the other input is high during Y time.

Referring now to FIG. 2*c*, the controls of triggers 101, 102, 103, 104 of the arithmetical unit are considered in the light of the multiplication and division controls, and particularly the inhibition of the outputs through diodes 220, 221, 222, 223. AND circuit 220 transmits to the right output of the addition-subtraction trigger 103 the output of inverter 110, the input of which is the output of OR circuit 224. Trigger 103 is thus reset to the add position in two cases. AND circuit 113 is conditioned when a program is changed, and when trigger 103 is reset on the occurrence of pulse CPD.

AND circuit 221 transmits the output of inverter 109 to the right output of carry trigger 102. Therefore trigger 102 is reset by pulse CPD for each program change.

AND circuits 222 and 223 transmit the output of inverter 108 when it is low to the right gate of accumulator trigger 101 and carry trigger 102, respectively.

This occurs at the end of the sign time so as to reset the triggers before beginning the actual computation.

For a multiplication or a division, even if there is a carry at the end of the cycle, a complement cycle is not started, since the "no multiplication or division" signal is not applied to AND circuit 136 which controls the right gate of trigger 104.

*Control of the information recording into the memory*

The lower part of FIG. 2*h* shows an OR circuit 225 which provides the recording control. As previously noted, the recording in a core is systematically controlled at X time when the accumulator indicates a 1; and at Y time when, during addition, the accumulator indicates a 1; or when, during subtraction, it indicates a 0 except for certain particular cases. The recording of a 1 is determined by AND circuit 226, one input of which is the right output of accumulator trigger 101. The other input is in the output of inverter 227 and is always high except during the sign time of the first multiplication cycle in X. The latter case corresponds to the transfer of word W2 to W3, which is made for all the bits except that of the sign.

When a subtraction has been called for, a 1 is written at Y time when the accumulator indicates a 0 due to AND circuits 229 and 230. The inputs of AND circuit 229 indicate subtraction and the Y time, sign time not included. Its output is connected to inverter 228, the output of which is low at Y time for a subtraction and therefore inhibits the output of AND circuit 226. On the other hand, when the output of AND circuit 229 is high and a 0 is stored in the accumulator trigger, the output of AND circuit 230 is high, which causes a 1 to be recorded.

The output of inverter 231 constitutes another input to OR circuit 225. This input to inverter 231 is connected to inverter 232, the output of which is low at Y time of the cycles, during which a number of the decoder is used, since its input is conditioned by the output of AND circuit 223, one input of which is high at Y time and the other when a voltage is applied to one of the hubs such as 34, 35 or 36. In such a case, a 1 is systematically recorded in all the cores of the decoder, since it contains the binary equivalent of the various powers of 10.

The fourth input of OR circuit 225 is the output of AND circuit 235 which corresponds to the formation of the quotient for division. The quotient is formed during the odd cycles, a 1 being recorded in the lower order of number W2 when, during the preceding cycles, the divisor multiplied by the suitable power of two of the dividend has been successfully subtracted, and a 0 being recorded when, the subtraction not being possible, the add-subtract trigger has been turned OFF (which indicates an addition is to follow) at the end of the cycle. The four inputs of AND circuit 235 meet the recording requirements of a 1 when they are high. One is high during the odd cycle, except during the sign time; the second one is high on division; the third one receives the first pulse of the primary chain corresponding to the scanning of the two lower positions of word W2 (but the position corresponding to the sign time is eliminated by the first input); the fourth input is high when the addition-subtraction trigger indicates a subtraction.

*Half-adjustment or rounding off*

It has been shown that the binary information stored in the decoder may be shifted one column to the right so that if it is desired to add the contents of line 100 of the decoder for example to a word of the memory, it is an addition of 50 which is actually made, unless the decoder read pulses are delayed by one bit time. Such arrangement is used in the half-adjustment. If it is desired to half-adjust a word of the memory for the last two decimal orders, an addition of the decoder word containing the binary equivalent of 100/2 is made to the memory word. Following this, a shift of two decimal orders to the right may be programmed, in which the last two digits on the right are dropped.

Obviously, the rounding may be accomplished at any of the decimal orders by adding the binary equivalent of a decimal half-adjust quantity. If N is defined as the decimal order to which rounding is to be accomplished, then the decimal half-adjust quantity would be $5\times10^{n-1}$. The order number *n* may be any positive or negative integer or it may be zero.

PROGRAMMING

The arithmetical operations are run according to a program selected through connections, the operation of which is explained with reference to FIG. 2*e*, wherein there have been represented the first two and the last two program steps.

The program steps comprise triggers 71, 72, 73 and 74 respectively. These steps are identical so a description of the first one is sufficient.

The left gate of trigger 71 being grounded, it is normally OFF and its output is low. A positive pulse applied to hub 75 or input hub, selects the right gate, and when the program advance pulse is ON received on line 82, trigger 71 is switched ON and its right output is high, raising hubs 76 and 79. When voltages are applied by 83 and 84 to AND circuits 80 and 81, high voltages occur respectively on hubs 77 and 78. Each hub corresponds to a determined function. Hub 76 or instruction hub determines the instruction, which is the operation to be effected on words. It may be connected to one of the addition, subtraction, multiplication, division, half-adjust, or column-shift hubs. Hubs 77 or X word hubs, and 78 or Y word hubs, determine the memory locations, the information data of which are analyzed at times X and Y, respectively. Each hub is connected to a memory word input hub, and according to the controls 83 for word X and 84 for word Y, the corresponding memory word may be scanned.

Hub 79 or output hub is connected to the input hub of another program step which will turn ON the latter with the following program advance pulse.

*Change in the program*

The program operation is controlled through the progressive switching of the triggers. It is therefore possible to change the program sequence during its operation, since the result of an operation effected during one step determines the selection of the following program step. This is accomplished by the device represented in the lower part of FIG. 2*i*.

When balance test hub 240 is energized, one of hubs 241, 242, 243, 244 may raise in potential, as determined by AND circuits 251, 252, 253 and 254, respectively. The left and right outputs of trigger 245 are respectively connected to the inputs of AND circuits 251 and 252. Trigger 245 is supplied CPD pulses which are operative only when the electronic gates are raised. A signal is applied to the left output at sign time, the trigger, therefore, is normally OFF at the sign time; however, if the accumulator indicates a 1 at the sign time of word Y, the three inputs of AND circuit 247 are up, the right gate of trigger 245 is selected and the trigger is turned ON. It is seen that this happens when the result of an operation is negative. Thus hub 241 indicates a positive sign for result of an operation effected when hub 240 was energized. During an operation which involves a sign change during successive cycles, for instance subtractions determining a complement cycle, only the last digit read is valid, because the information available on hubs 241 to 244 is used only at the end of the program in combination with the advance pulse which brings the following program step.

On the other hand, the left and right outputs of trigger 246 are connected to AND circuits 253 and 254. The trigger is turned OFF at 31DY with a CPD pulse, in other words at the end of a scanning cycle. This trigger is turned ON when a 1 is recorded in the word representing the result of an operation. The electronic gate associated with the right side of trigger 246 is connected to the output of OR circuit 249, which has inputs from AND circuit 230, which indicates the recording of a 1 during subtraction and from AND circuit 248, which indicates the recording of a 1 during addition. Since trigger 246 is switched on when a 1 is recorded, hub 243 indicates that the result of an operation contained no 1's and is therefore 0. Hub 244 indicates that the result is not 0 since it contained a 1.

*Electronic selectors*

The lower portion of FIG. 2*e* contains a representation of an electronic selector, which permits an increase in the operating possibilities of the arithmetic unit. Although but a single selector has been shown, it is obvious that more may be added as required.

Each selector comprises a trigger 225, which is switched in response to a program advance pulse when its gates are selected. The right and left gates are connected to hubs 256 and 257, respectively. The right and left outputs of trigger 255 constitute one input of AND circuits 259 and 258, respectively, which are connected to hubs 260 and 261. The other input of these AND circuits is connected in common through emitter-follower 263 to hub 262. The selector operates in the following way: It is turned ON through hub 256 or OFF by hub 257. These hubs are normally wired to a balance test hub, such as hubs 241–244. The program advance hub will then impulse the trigger ON or OFF. On a following cycle a program hub, such as 79, may be used to impulse input 262 to interrogate the status of the selector.

These selectors may maintain the result of the electronic control performed in view of a program change. This control may be produced at a step subsequent to the control step. They may also be used to provide a loop. The *n*th program step being connected to the first one so that the first n steps run twice, while the second time the *n*th step energizes the $n+1$th step.

While the invention has been particularly shown and described with reference to a preferred embodiment thereof, it will be understood by those skilled in the art that various changes in form and details may be made therein without departing from the spirit and scope of the invention.

What is claimed is:

1. A serial adder comprising a first bistable circuit for storing a first digit to be added, a second bistable circuit for storing a carry, both said bistable circuits having an input gate whereby the circuit will be reversed in state in response to a voltage pulse applied thereto provided the gate has been conditioned by a further signal, a clock source coupled to both bistable circuits for providing a timed voltage pulse thereto, a logic circuit coupled to receive a second digit to be added and further coupled to receive the carry indication from the second bistable circuit, said logic circuit being operable to generate a change signal when the second digit is not equal to the carry, said logic circuit being coupled to the input gate of the first bistable circuit whereby a change signal when generated will condition the gate and cause the first bistable circuit to be reversed in state by the next succeeding voltage pulse from the clock source.

2. The adder according to claim 1 wherein the second bistable circuit includes an input gate requiring two signals for conditioning in order that a voltage pulse may reverse the state of the circuit, said logic circuit being coupled to the input gate of the second bistable circuit whereby the change signal constitutes one conditioning signal, said first bistable circuit being coupled to the input gate of the second bistable circuit whereby the state of the first bistable circuit determines the second conditioning signal for the second bistable circuit.

3. An adder comprising a first input means for receiving a signal representative of a first digit to be added, a second input means for receiving a signal representative of a second digit to be added, a first bistable circuit connected to said first input means for storing the first digit, a second bistable circuit for storing a carry, a first exclusive OR circuit coupled to the first input means and the first bistable circuit for developing a set signal when the first digit is not represented by the initial state of the bistable circuit, a second exclusive OR circuit coupled to the second input means and to the second bistable circuit for developing a change signal when the second digit is not equal to a carry indicated by the state of the second bistable circuit, said first bistable circuit being coupled to both of the exclusive OR circuits whereby both signals developed will be operative to reverse the state of the first bistable circuit.

4. In a subtraction device, first input means for receiving a signal representative of a first digit of the subtrahend, second input means for receiving a signal representative of a corresponding digit of the minuend, a first bistable circuit, means connecting said first bistable circuit to said first input means to store said subtrahend digit, a second bistable circuit for storing a carry from a preceding operation, a pair of input gates for said second bistable circuit, said gates requiring two signals to effect a change of state of said second bistable circuit, means connected to said second input means and said second bistable circuit for developing a change signal when the minuend digit corresponds to said carry, means for applying said change signal to said first bistable circuit to reverse the state thereof, means for applying said change signal to said second bistable circuit input gate, means connecting the respective outputs of said first bistable circuit to the corresponding gates of said second bistable circuit whereby said change signal leaves said second bistable circuit in the same state as the initial state of said first bistable circuit.

5. A subtractor comprising a first input means for receiving a signal representative of a first digit to be subtracted, a second input means for receiving a signal representative of a minuend, a first bistable circuit connected to said first input means for storing the first digit, a second bistable circuit for storing a carry, a first exclusive OR circuit coupled to the first input means and the first bistable circuit for developing a set signal when the first digit is not represented by the initial state of the bistable circuit, a second exclusive OR circuit coupled to the second input means and to the second bistable circuit for developing a change signal when the second digit is equal to a carry indicated by the state of the second bistable circuit, said first bistable circuit being coupled to both of the exclusive OR circuits whereby both signals developed will be operative to reverse the state of the first bistable circuit.

6. In a subtraction device,
 a binary storage means for storing a first digit of the subtrahend which may be switched to a new state indicative of a binary status different from a first binary status,
 a bistable circuit for storing a carry, said bistable circuit being connected to be normally in a status indicative of no carry,
 means for receiving a corresponding digit of the minuend,
 logic means coupled to said second bistable circuit and said minuend receiving means for generating a change signal when said minuend digit is equal to said carry,
 means connecting said binary storage means to said logic means whereby said binary storage means is switched in state in response to a change signal,
 means connecting said bistable circuit to said logic means whereby said bistable circuit is set to a state corresponding to the subtrahend digit in response to a change signal.

7. In a circuit for combining first and second binary numbers,
 a binary storage means for storing a digit of the first number which may be switched to a new state indicative of a binary status different from a first binary status,
 a first bistable circuit for storing a carry digit from a preceding operation, said first bistable circuit being connected to be normally in a status indicative of no carry,
 means for receiving a corresponding digit of the second number,
 a second bistable circuit,
 logic means coupled to said first and second bistable circuits and said digit receiving means for generating a change signal when the complement of the digit of the second number is not equal to the carry digit and the second bistable circuit is in the subtract condition and for generating a change signal when the digit of the second number is not equal to the carry digit and the second bistable circuit is in the add condition,
 means connecting said binary storage means to said logic means whereby said binary storage means is switched in state in response to said change signal,
 means connecting said first bistable circuit to said logic means and said binary storage means whereby said first bistable circuit is set to a state corresponding to the digit of the first number in response to a change signal.

8. A serial subtractor comprising a first bistable circuit for storing a digit to be subtracted, a second bistable circuit for storing a carry, both said bistable circuits each having an input gate whereby the circuit will be reversed in state in response to a voltage pulse supplied thereto provided the gate has been conditioned by a further signal, the input gate of said second bistable circuit requiring two signals for conditioning in order that a voltage pulse may reverse the state of said second bistable circuit, a clock source coupled to both said bistable circuits for providing a timed voltage pulse thereto, a logic circuit coupled to receive a second digit representative of the minuend and further coupled to receive the carry indication from said second bistable circuit, said logic circuit being operable to generate a change signal when the second digit is equal to the carry, said logic circuit being coupled to the said input gate of said first bistable circuit and said logic circuit also being coupled to the said input gate of said second bistable circuit so that the change signal constitutes one conditioning signal, said first bistable circuit being coupled to the said input gate of said second bistable circuit so that the state of said first bistable circuit determines the second conditioning for said second bistable circuit and a change signal when generated will condition the said gates of said first and second bistable circuits and cause said first bistable circuit to be reversed in state by the next succeeding voltage pulse from the clock source.

References Cited by the Examiner

UNITED STATES PATENTS

| | | | |
|---|---|---|---|
| 2,346,616 | 4/44 | Saxby | 235—156 |
| 2,544,126 | 3/51 | Baldwin | 235—156 |
| 2,844,308 | 7/58 | Dussine | 235—176 |
| 2,904,252 | 9/59 | Bird | 235—176 |
| 2,941,719 | 6/60 | Gloess et al. | 235—164 |
| 2,962,214 | 11/60 | Gordon et al. | 235—164 |

OTHER REFERENCES

Richards: Arithmetic Operations in Digital Computers, Van Nostrand Co., Inc., 1955, copy in division 68.

MALCOLM A. MORRISON, *Primary Examiner.*

CORNELIUS D. ANGEL, *Examiner.*